United States Patent
Zhang et al.

(10) Patent No.: US 10,517,010 B2
(45) Date of Patent: Dec. 24, 2019

(54) WIRELESS LOCAL AREA NETWORK WLAN MEASUREMENT AND REPORTING METHOD AND RELATED DEVICE

(71) Applicant: HUAWEI TECHNOLOGIES CO., LTD., Shenzhen (CN)

(72) Inventors: Hongzhuo Zhang, Shanghai (CN); Yi Guo, Shenzhen (CN); Jing Liu, Shanghai (CN); Wenjie Peng, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/894,935

(22) Filed: Feb. 13, 2018

(65) Prior Publication Data
US 2018/0176812 A1     Jun. 21, 2018

Related U.S. Application Data

(63) Continuation of application No. PCT/CN2015/087092, filed on Aug. 14, 2015.

(51) Int. Cl.
*H04W 24/10* (2009.01)
*H04W 36/00* (2009.01)
(Continued)

(52) U.S. Cl.
CPC ........... *H04W 24/10* (2013.01); *H04W 36/00* (2013.01); *H04W 36/0061* (2013.01);
(Continued)

(58) Field of Classification Search
CPC . H04W 24/10; H04W 36/00; H04W 36/0061; H04W 36/14; H04W 76/02;
(Continued)

(56) References Cited

U.S. PATENT DOCUMENTS 9,801,090 B2 * 10/2017 Tan Bergstrom ..... H04W 24/10
9,872,233 B2 *  1/2018 Jeon ...................... H04W 48/16
(Continued)

FOREIGN PATENT DOCUMENTS

| CN | 101841880 A | 9/2010 |
| CN | 102026264 A | 4/2011 |

(Continued)

OTHER PUBLICATIONS

3GPP TSG RAN WG2 Meeting #90 R2-152543,"Considerations on the measurement for LTE/WLAN aggregation and interworking enhancements",China Telecom,May 25-29, 2015,total 4 pages.
(Continued)

*Primary Examiner* — Tri H Phan
(74) *Attorney, Agent, or Firm* — Kilpatrick Townsend & Stockton LLP

(57) ABSTRACT

Embodiments of the present invention provide a wireless local area network WLAN measurement and reporting method, and a related device. The method includes: acquiring, by a user terminal, WLAN group information, where the WLAN group information indicates at least one WLAN group; determining, by the user terminal, whether at least one WLAN in the WLAN group satisfies WLAN measurement configuration information; and reporting, by the user terminal, a measurement result of the at least one WLAN in the WLAN group to a base station when the at least one WLAN in the WLAN group satisfies the WLAN measurement configuration information. Therefore, a signaling resource can be saved, thereby reducing signaling load caused by simultaneous reporting of a large quantity of WLAN measurement results.

19 Claims, 4 Drawing Sheets

(51) Int. Cl.
*H04W 76/10* (2018.01)
*H04W 36/14* (2009.01)
*H04W 84/12* (2009.01)
*H04W 88/02* (2009.01)

(52) U.S. Cl.
CPC ............ *H04W 76/10* (2018.02); *H04W 36/14* (2013.01); *H04W 84/12* (2013.01); *H04W 88/02* (2013.01)

(58) Field of Classification Search
CPC ..... H04W 76/10; H04W 84/12; H04W 88/02; H04W 4/08; H04W 24/00; H04W 24/02; H04W 36/0005; H04W 36/0009; H04W 36/0055; H04W 36/0058; H04W 36/03; H04W 36/16; H04W 36/24; H04W 36/30; H04W 36/165; H04W 36/305; H04W 76/40
See application file for complete search history.

(56) References Cited

U.S. PATENT DOCUMENTS

| | | | | |
|---|---|---|---|---|
| 10,194,360 | B2* | 1/2019 | Sirotkin | H04W 24/10 |
| 2013/0242783 | A1 | 9/2013 | Horn et al. | |
| 2013/0336153 | A1 | 12/2013 | Liang et al. | |
| 2015/0146702 | A1 | 5/2015 | He et al. | |
| 2016/0316405 | A1* | 10/2016 | Balan | H04W 24/10 |
| 2018/0092147 | A1* | 3/2018 | Pelletier | H04L 63/205 |
| 2018/0220319 | A1* | 8/2018 | Kim | H04W 24/10 |
| 2018/0227784 | A1* | 8/2018 | Kim | H04W 24/08 |
| 2018/0227812 | A1* | 8/2018 | Nagasaka | H04W 24/10 |
| 2018/0242226 | A1* | 8/2018 | He | H04W 24/04 |

FOREIGN PATENT DOCUMENTS

| | | |
|---|---|---|
| CN | 103391632 A | 11/2013 |
| EP | 3331272 A1 | 6/2018 |
| WO | 2011025597 A1 | 3/2011 |
| WO | 2015113597 A1 | 8/2015 |
| WO | 2017018460 A1 | 2/2017 |

OTHER PUBLICATIONS

3GPP TSG RAN WG2 Meeting #90 R2-153556,"RRM measurements for LTE-WLAN aggregation and interworking enhancement",Huawei, HiSilicon,Aug. 24-28, 2015,total 4 pages.

3GPP TS 36.331 V12.6.0 (Jun. 2015);3rd Generation Partnership Project;Technical Specification Group Radio Access Network;Evolved Universal Terrestrial Radio Access (E-UTRA);Radio Resource Control (RRC);Protocol specification (Release 12),total 449 pages.

3GPP TS 36.300 V13.0.0 (Jun. 2015);3rd Generation Partnership Project;Technical Specification Group Radio Access Network;Evolved Universal Terrestrial Radio Access (E-UTRA) and Evolved Universal Terrestrial Radio Access Network (E-UTRAN),Overall description,Stage 2(Release 13),total 254 pages.

R2-152475 Ericsson,"WLAN measurement reporting",3GPP TSG-RAN WG2 #90,Fukuoka, Japan, May 25-29, 2015, total 5 pages.

LG Electronics Inc., Traffic steering command for WLAN interworking enhancement, R2-152732, 3GPP TSG-RAN WG2 #90, May 16, 2015,total 3 pages.

CATT, Considerations on WLAN Measurements, R2-151309, 3GPP TSG RAN WG2 Meeting #89bis, Apr. 10, 2015,total 3 pages.

* cited by examiner

WIRELESS LOCAL AREA NETWORK WLAN MEASUREMENT AND REPORTING METHOD AND RELATED DEVICE

CROSS-REFERENCE TO RELATED APPLICATIONS

This application is a continuation of International Application No. PCT/CN2015/087092, filed on Aug. 14, 2015, the disclosure of which is hereby incorporated by reference in its entirety.

TECHNICAL FIELD

The present disclosure relates to the field of mobile networks, and in particular, to a wireless local area network (WLAN) measurement and reporting method and a related device.

BACKGROUND

With rapid development of mobile Internet, data traffic of mobile communications networks shows an explosive growth tendency. To meet rapidly increasing data requirements of users, a LWA (LTE-WLAN aggregation) technology in which both an LTE (Long Term Evolution) network and a WLAN (Wireless LAN, wireless local area network) provide services for a user terminal starts to be researched. By means of the LWA technology, the user terminal can use radio resources of both the LTE network and the WLAN, so that a transmission bandwidth dramatically increases. Therefore, the user terminal can obtain a higher transmission rate and higher service quality. The WLAN may be WiFi or another local radio access network. The LWA technology may also be referred to as LTE-WLAN multiple stream aggregation (LTE-WLAN MSA), or LTE-WLAN dual connectivity (LTE-WLAN DC), or LTE-WLAN radio integration.

A basic service set (BSS) is a basic component of the WLAN, and generally includes one access point AP and multiple stations (STA). An extended service set (ESS) includes multiple BSSs. Each BSS has a unique identifier, that is, a BSSID or a BSS identifier. Because the BSS generally has one access point AP, the BSSID is generally an identifier of the access point AP, that is, a Media Access Control (MAC) address of the AP. A BSSID, an SSID, and an (H) ESSID can be used to identify a WLAN. Sometimes, to achieve higher accuracy, a WLAN may also be identified by using the foregoing WLAN identifier plus information about a frequency of the WLAN or a channel number of the WLAN.

For the WLAN, a network side service device is an AP, and a user side terminal device is a STA, while for a mobile cellular network, a network side service device is a base station, and a user side terminal device is UE. In a heterogeneous network scenario of the present disclosure that includes a WLAN and a mobile cellular network, a user side terminal device may be referred to as UE or a STA, and can receive services of both networks. For ease of description, in the present disclosure, the user side terminal device is collectively referred to as UE.

As shown in FIG. 1, FIG. 1 is a schematic diagram of a network architecture of LWA. An eNB (a base station) is connected to a WLAN AP (access point) by using a WT (WLAN termination), and the eNB may be connected to multiple WTs. One WT is connected to at least one AP, where the WT is a logical node that connects a base station of an LTE network and an AP of a WLAN. When the LTE and the WLAN are aggregated, data arrives at the eNB (a line 1) through a core network. The eNB sends some of the data to UE (User Equipment, user terminal) by using an LTE link (a line 3), and sends remaining data to the UE by using a WLAN link (a line 2). Uplink data is sent in a similar manner. The user terminal sends data to the network by using both the LTE link (the line 3) and the WLAN link (the line 2). As shown in FIG. 2, FIG. 2 is a flowchart of a specific implementation method of LWA. In step 1, an eNB delivers WLAN measurement configuration information to UE, to instruct the UE to measure a WLAN. The WLAN measurement configuration information includes multiple measurement events. In step 2, the UE sends, to the eNB, information of a WLAN and signal quality of the WLAN that are obtained by means of measurement by the UE.

In an existing technical solution, an eNB needs to configure WLAN measurement configuration information for UE as needed. The WLAN measurement configuration information includes at least one of the following WLAN measurement events: signal quality of a serving WLAN is greater than a first threshold; signal quality of a serving WLAN is less than a second threshold; signal quality of a neighboring WLAN is greater than a sum of signal quality of a serving WLAN and a third threshold; signal quality of a serving WLAN is less than a fourth threshold and signal quality of a neighboring WLAN is greater than a fifth threshold; signal quality of a neighboring WLAN is greater than a sixth threshold; or radio signal quality of a neighboring WLAN is less than a seventh threshold. The UE reports a measurement result to the eNB, provided that one WLAN that satisfies at least one of the configured measurement events is obtained by means of measurement by the UE. Therefore, in a scenario in which WLANs are intensively deployed, reporting of a large quantity of WLAN measurement results may be simultaneously triggered, causing a waste of signaling resources and excessive signaling load.

SUMMARY

The present disclosure provides a wireless local area network WLAN measurement and reporting method and a related device, which can save a signaling resource, thereby reducing signaling load caused by simultaneous reporting of a large quantity of WLAN measurement results.

In the present disclosure, WLANs are divided into several groups. Each group may include one or more WLANs. For example, a group 1 includes three WLANs, and WLAN identifiers of the three WLANs are BSSID 1, BSSID 2, and BSSID 3 respectively. A group 2 includes one WLAN, and a WLAN identifier of the WLAN is BSSID 4 on a channel number 10. A WLAN service network associated with UE is referred to as a serving WLAN. A group including a serving WLAN is referred to as a serving WLAN group. A group that does not include a serving WLAN is referred to as a neighboring WLAN group. When the UE is not associated with any WLAN, all WLAN groups may be referred to as a neighboring WLAN group.

A first aspect of embodiments of the present invention provides a wireless local area network WLAN measurement and reporting method, including:

acquiring, by a user terminal, WLAN group information, where the WLAN group information indicates at least one WLAN group;

determining, by the user terminal, whether at least one WLAN in the WLAN group satisfies a configured measurement event; and reporting, by the user terminal, a measurement result of the at least one WLAN in the WLAN group that satisfies the configured measurement event to a base station, when the at least one WLAN in the WLAN group satisfies the configured measurement event.

In a first possible implementation manner of the first aspect, the WLAN group includes a serving WLAN group and/or a neighboring WLAN group; and the WLAN measurement configuration information includes at least one of the following measurement events:

a measurement event 1: signal quality of at least one WLAN in the serving WLAN group is greater than a first threshold;

a measurement event 2: signal quality of at least one WLAN in the serving WLAN group is less than a second threshold;

a measurement event 3: signal quality of at least one WLAN in the neighboring WLAN group is greater than a sum of signal quality of any one of at least one WLAN in the serving WLAN group and a third threshold, where the measurement event 3 has the following four possible forms:

a use case 1: radio signal quality of multiple WLANs in the neighboring WLAN group is greater than a sum of signal quality of one WLAN in the serving WLAN group and the third threshold;

a use case 2: radio signal quality of multiple WLANs in the neighboring WLAN group is greater than a sum of signal quality of any one WLAN of multiple WLANs in the serving WLAN group and the third threshold;

a use case 3: radio signal quality of one WLAN in the neighboring WLAN group is greater than a sum of signal quality of one WLAN in the serving WLAN group and the third threshold; and a use case 4: radio signal quality of one WLAN in the neighboring WLAN group is greater than a sum of signal quality of any one WLAN of multiple WLANs in the serving WLAN group and the third threshold;

a measurement event 4: signal quality of at least one WLAN in the neighboring WLAN group is greater than a fourth threshold and signal quality of at least one WLAN in the serving WLAN group is less than a fifth threshold, where the measurement event 4 has the following four possible forms:

a use case 1: radio signal quality of multiple WLANs in the neighboring WLAN group is greater than the fourth threshold and radio signal quality of one WLAN in the serving WLAN group is less than the fifth threshold;

a use case 2: radio signal quality of one WLAN in the neighboring WLAN group is greater than the fourth threshold and radio signal quality of one WLAN in the serving WLAN group is less than the fifth threshold;

a use case 3: radio signal quality of multiple WLANs in the neighboring WLAN group is greater than the fourth threshold and radio signal quality of multiple WLANs in the serving WLAN group is less than the fifth threshold; and a use case 4: radio signal quality of one WLAN in the neighboring WLAN group is greater than the fourth threshold and radio signal quality of multiple WLANs in the serving WLAN group is less than the fifth threshold;

a measurement event 5: signal quality of at least one WLAN in the neighboring WLAN group is greater than a sixth threshold; or a measurement event 6: signal quality of at least one WLAN in the neighboring WLAN group is less than a seventh threshold, where the serving WLAN group is a WLAN group comprising the WLAN associated with the user terminal, and the neighboring WLAN group is another WLAN group that does not include the WLAN associated with the user terminal. When the UE is not associated with any WLAN, all WLAN groups may be referred to as a neighboring WLAN group.

With reference to the first possible implementation manner of the first aspect, in a second possible implementation manner of the first aspect, the measurement event 1 specifically includes:

signal quality of all WLANs in the serving WLAN group is greater than the first threshold.

With reference to the first possible implementation manner of the first aspect, in a third possible implementation manner of the first aspect, the measurement event 2 specifically includes:

signal quality of all WLANs in the serving WLAN group is less than the second threshold.

With reference to the first possible implementation manner of the first aspect, in a fourth possible implementation manner of the first aspect, the measurement event 3 specifically includes:

signal quality of at least one WLAN in the neighboring WLAN group is greater than a sum of signal quality of any WLAN in the serving WLAN group and the third threshold.

With reference to the first possible implementation manner of the first aspect, in a fifth possible implementation manner of the first aspect, the measurement event 4 specifically includes:

signal quality of at least one WLAN in the neighboring WLAN group is greater than the fourth threshold and signal quality of all WLANs in the serving WLAN group is less than the fifth threshold.

With reference to any one of the first aspect or the first to the fifth possible implementation manners of the first aspect, in a sixth possible implementation manner of the first aspect, before the acquiring, by a user terminal, WLAN group information, the method further includes:

receiving, by the user terminal, the WLAN measurement configuration information sent by the base station.

With reference to any one of the first aspect or the first to the fifth possible implementation manners of the first aspect, in a seventh possible implementation manner of the first aspect, the WLAN measurement configuration information further includes a channel number and/or frequency information of the WLAN; and before the reporting, by the user terminal, a measurement result of the at least one WLAN in the WLAN group to a base station, the method further includes:

measuring, by the user terminal, the at least one WLAN in the WLAN group according to the channel number and/or the frequency information of the WLAN.

With reference to any one of the first aspect or the first to the seventh possible implementation manners of the first aspect, in an eighth possible implementation manner of the first aspect, the WLAN measurement configuration information further includes a measurement report reporting manner and/or a measurement report reporting period; and the reporting, by the user terminal, a measurement result of the at least one WLAN in the WLAN group to a base station when the at least one WLAN in the WLAN group satisfies the configured measurement event includes:

reporting, by the user terminal, the measurement result of the at least one WLAN in the WLAN group that satisfies the configured measurement event to the base station according to the measurement report reporting manner and/or the measurement report reporting period.

With reference to any one of the first aspect or the first to the eighth possible implementation manners of the first aspect, in a ninth possible implementation manner of the first aspect, the measurement result includes a network identifier of a WLAN, and the reporting, by the user terminal, a measurement result of the at least one WLAN in the WLAN group that satisfies the configured measurement event to a base station includes:

reporting, by the user terminal, a network identifier of the at least one WLAN in the WLAN group that satisfies the configured measurement event to the base station.

With reference to the ninth possible implementation manner of the first aspect, in a tenth possible implementation manner of the first aspect, the test result further includes one or more of: a group identifier of a WLAN, signal quality of a WLAN, load of a WLAN, or a transmission rate of a WLAN.

With reference to any one of the tenth possible implementation manner of the first aspect, in an eleventh possible implementation manner of the first aspect, the WLAN measurement configuration information further includes measurement result reporting configuration information, and the reporting configuration information of the measurement result indicates that the user terminal needs to report, to the base station, at least one of: the group identifier of the WLAN, the signal quality of the WLAN, the load of the WLAN, or the transmission rate of the WLAN.

With reference to any one of the first to the eleventh possible implementation manners of the first aspect, in a twelfth possible implementation manner of the first aspect, the signal quality of the WLAN includes at least one of: a received signal strength indicator RSSI, received signal code power RSCP, or a received signal-to-noise ratio indicator RSNI.

With reference to any one of the first aspect or the first to the twelfth possible implementation manners of the first aspect, in a thirteenth possible implementation manner of the first aspect, the WLAN group includes the network identifier of the WLAN.

With reference to the thirteenth possible implementation manner of the first aspect, in a fourteenth possible implementation manner of the first aspect, the WLAN group further includes a group identifier of the WLAN group.

With reference to any one of the first aspect or the first to the fourteenth possible implementation manners of the first aspect, in a fifteenth possible implementation manner of the first aspect, the acquiring, by a user terminal, WLAN group information includes:

acquiring, by the user terminal, the WLAN group information from a system message broadcast by the base station.

With reference to any one of the first aspect or the first to the fourteenth possible implementation manners of the first aspect, in a sixteenth possible implementation manner of the first aspect, the acquiring WLAN group information includes:

acquiring, by the user terminal, the WLAN group information from the WLAN measurement configuration information.

With reference to any one of the first aspect or the first to the fourteenth possible implementation manners of the first aspect, in a seventeenth possible implementation manner of the first aspect, the acquiring WLAN group information includes:

acquiring, by the user terminal, the WLAN group information from a dedicated radio resource control message, wherein the dedicated radio resource message is sent by the base station and is not the WLAN measurement configuration information.

In some embodiments, when a WLAN measurement event is configured, a WLAN quantity threshold that matches the measurement event and that is necessary for satisfying the measurement event may further be configured.

For example, if a WLAN quantity threshold of the measurement event 1 is 2, a condition to be satisfied for the measurement event 1 is:

the measurement event 1: signal quality of two WLANs in the serving WLAN group is greater than the first threshold.

If a WLAN quantity threshold of the measurement event 2 is 5, a condition to be satisfied for the measurement event 2 is:

the measurement event 2: signal quality of five WLANs in the serving WLAN group is less than the first threshold.

If a serving WLAN quantity threshold of the measurement event 3 is 2, and a neighboring WLAN quantity threshold is 4, a condition to be satisfied for the measurement event 3 is:

the measurement event 3: signal quality of four WLANs in the neighboring WLAN group is greater than a sum of signal quality of either of two WLANs in the serving WLAN group and the third threshold.

If a serving WLAN quantity threshold of the measurement event 4 is 2, and a neighboring WLAN quantity threshold is 4, a condition to be satisfied for the measurement event 4 is:

the measurement event 4: signal quality of four WLANs in the neighboring WLAN group is greater than the fourth threshold and signal quality of two WLANs in the serving WLAN group is less than the fifth threshold.

If a neighboring WLAN quantity threshold of the measurement event 5 is 4, a condition to be satisfied for the measurement event 5 is:

the measurement event 5: signal quality of four WLANs in the neighboring WLAN group is greater than the sixth threshold.

If a neighboring WLAN quantity threshold of the measurement event 6 is 3, a condition to be satisfied for the measurement event 6 is:

the measurement event 6: signal quality of three WLANs in the neighboring WLAN group is less than the seventh threshold.

A second aspect of the embodiments of the present invention provides a wireless local area network WLAN measurement and reporting method, including:

receiving, by a base station, a measurement result that is sent by a user terminal and that is of at least one WLAN in a WLAN group; and allocating, by the base station, a WLAN group to the user terminal according to the measurement result, so that the user terminal selects a proper WLAN from the WLAN group and is connected to the WLAN.

In a first possible implementation manner of the second aspect, before the receiving a measurement result that is sent by a user terminal and that is of at least one WLAN in a WLAN group, the method further includes:

sending, by the base station, WLAN measurement configuration information to the user terminal, so that the user terminal determines whether the at least one WLAN in the WLAN group satisfies the configured measurement event, and the user terminal reports the measurement result of the at least one WLAN in the WLAN group that satisfies the configured measurement event to the base station, when the user terminal determines that the at least one WLAN in the WLAN group satisfies the configured measurement event.

With reference to the first possible implementation manner of the second aspect, in a second possible implementation manner of the second aspect, the WLAN group includes a serving WLAN group and/or a neighboring WLAN group, and the WLAN measurement configuration information includes at least one of the following measurement events:

a measurement event 1: signal quality of at least one WLAN in the serving WLAN group is greater than a first threshold;

a measurement event 2: signal quality of at least one WLAN in the serving WLAN group is less than a second threshold;

a measurement event 3: signal quality of at least one WLAN in the neighboring WLAN group is greater than a sum of signal quality of any one of at least one WLAN in the serving WLAN group and a third threshold, where the measurement event 3 has the following four possible forms:

a use case 1: radio signal quality of multiple WLANs in the neighboring WLAN group is greater than a sum of signal quality of one WLAN in the serving WLAN group and the third threshold;

a use case 2: radio signal quality of multiple WLANs in the neighboring WLAN group is greater than a sum of signal quality of any one WLAN of multiple WLANs in the serving WLAN group and the third threshold;

a use case 3: radio signal quality of one WLAN in the neighboring WLAN group is greater than a sum of signal quality of one WLAN in the serving WLAN group and the third threshold; and a use case 4: radio signal quality of one WLAN in the neighboring WLAN group is greater than a sum of signal quality of any one WLAN of multiple WLANs in the serving WLAN group and the third threshold;

a measurement event 4: signal quality of at least one WLAN in the neighboring WLAN group is greater than a fourth threshold and signal quality of at least one WLAN in the serving WLAN group is less than a fifth threshold, where the measurement event 4 has the following four possible forms:

a use case 1: radio signal quality of multiple WLANs in the neighboring WLAN group is greater than the fourth threshold and radio signal quality of one WLAN in the serving WLAN group is less than the fifth threshold;

a use case 2: radio signal quality of one WLAN in the neighboring WLAN group is greater than the fourth threshold and radio signal quality of one WLAN in the serving WLAN group is less than the fifth threshold;

a use case 3: radio signal quality of multiple WLANs in the neighboring WLAN group is greater than the fourth threshold and radio signal quality of multiple WLANs in the serving WLAN group is less than the fifth threshold; and a use case 4: radio signal quality of one WLAN in the neighboring WLAN group is greater than the fourth threshold and radio signal quality of multiple WLANs in the serving WLAN group is less than the fifth threshold;

a measurement event 5: signal quality of at least one WLAN in the neighboring WLAN group is greater than a sixth threshold; or a measurement event 6: signal quality of at least one WLAN in the neighboring WLAN group is less than a seventh threshold, where the serving WLAN group is a WLAN group comprising the WLAN associated with the user terminal, and the neighboring WLAN group is another WLAN group that does not include the WLAN associated with the user terminal. When the UE is not associated with any WLAN, all WLAN groups may be referred to as a neighboring WLAN group.

In some embodiments, when a WLAN measurement event is configured, a WLAN quantity threshold that matches the measurement event and that is necessary for satisfying the measurement event may further be configured.

For example, if a WLAN quantity threshold of the measurement event 1 is 2, a condition to be satisfied for the measurement event 1 is:

the measurement event 1: signal quality of two WLANs in the serving WLAN group is greater than the first threshold.

If a WLAN quantity threshold of the measurement event 2 is 5, a condition to be satisfied for the measurement event 2 is:

the measurement event 2: signal quality of five WLANs in the serving WLAN group is less than the first threshold.

If a serving WLAN quantity threshold of the measurement event 3 is 2, and a neighboring WLAN quantity threshold is 4, a condition to be satisfied for the measurement event 3 is:

the measurement event 3: signal quality of four WLANs in the neighboring WLAN group is greater than a sum of signal quality of either of two WLANs in the serving WLAN group and the third threshold.

If a serving WLAN quantity threshold of the measurement event 4 is 2, and a neighboring WLAN quantity threshold is 4, a condition to be satisfied for the measurement event 4 is:

the measurement event 4: signal quality of four WLANs in the neighboring WLAN group is greater than the fourth threshold and signal quality of two WLANs in the serving WLAN group is less than the fifth threshold.

If a neighboring WLAN quantity threshold of the measurement event 5 is 4, a condition to be satisfied for the measurement event 5 is:

the measurement event 5: signal quality of four WLANs in the neighboring WLAN group is greater than the sixth threshold.

If a neighboring WLAN quantity threshold of the measurement event 6 is 3, a condition to be satisfied for the measurement event 6 is:

the measurement event 6: signal quality of three WLANs in the neighboring WLAN group is less than the seventh threshold.

A third aspect of the embodiments of the present invention provides a user terminal, where the user terminal includes:

an information acquiring module, configured to acquire WLAN group information, where the WLAN group information indicates at least one WLAN group;

an information determining module, configured to determine whether at least one WLAN in the WLAN group satisfies a configured measurement event; and a result reporting module, configured to report a measurement result of the at least one WLAN in the WLAN group to a base station when the at least one WLAN in the WLAN group satisfies the configured measurement event.

In a first possible implementation manner of the third aspect, the WLAN group includes a serving WLAN group and/or a neighboring WLAN group; and the WLAN measurement configuration information includes at least one of the following measurement events:

a measurement event 1: signal quality of at least one WLAN in the serving WLAN group is greater than a first threshold;

a measurement event 2: signal quality of at least one WLAN in the serving WLAN group is less than a second threshold;

a measurement event 3: signal quality of at least one WLAN in the neighboring WLAN group is greater than a sum of signal quality of any one of at least one WLAN in the serving WLAN group and a third threshold, where the measurement event 3 has the following four possible forms:

a use case 1: radio signal quality of multiple WLANs in the neighboring WLAN group is greater than a sum of signal quality of one WLAN in the serving WLAN group and the third threshold;

a use case 2: radio signal quality of multiple WLANs in the neighboring WLAN group is greater than a sum of signal quality of any one WLAN of multiple WLANs in the serving WLAN group and the third threshold;

a use case 3: radio signal quality of one WLAN in the neighboring WLAN group is greater than a sum of signal quality of one WLAN in the serving WLAN group and the third threshold; and a use case 4: radio signal quality of one WLAN in the neighboring WLAN group is greater than a sum of signal quality of any one WLAN of multiple WLANs in the serving WLAN group and the third threshold;

a measurement event 4: signal quality of at least one WLAN in the neighboring WLAN group is greater than a fourth threshold and signal quality of at least one WLAN in the serving WLAN group is less than a fifth threshold, where the measurement event 4 has the following four possible forms:

a use case 1: radio signal quality of multiple WLANs in the neighboring WLAN group is greater than the fourth threshold and radio signal quality of one WLAN in the serving WLAN group is less than the fifth threshold;

a use case 2: radio signal quality of one WLAN in the neighboring WLAN group is greater than the fourth threshold and radio signal quality of one WLAN in the serving WLAN group is less than the fifth threshold;

a use case 3: radio signal quality of multiple WLANs in the neighboring WLAN group is greater than the fourth threshold and radio signal quality of multiple WLANs in the serving WLAN group is less than the fifth threshold; and a use case 4: radio signal quality of one WLAN in the neighboring WLAN group is greater than the fourth threshold and radio signal quality of multiple WLANs in the serving WLAN group is less than the fifth threshold;

a measurement event 5: signal quality of at least one WLAN in the neighboring WLAN group is greater than a sixth threshold; or a measurement event 6: signal quality of at least one WLAN in the neighboring WLAN group is less than a seventh threshold, where the serving WLAN group is a WLAN group comprising the WLAN associated with the user terminal, and the neighboring WLAN group is another WLAN group that does not include the WLAN associated with the user terminal. When the UE is not associated with any WLAN, all WLAN groups may be referred to as a neighboring WLAN group.

With reference to the first possible implementation manner of the third aspect, in a second possible implementation manner of the third aspect, the measurement event 1 specifically includes:

signal quality of all WLANs in the serving WLAN group is greater than the first threshold.

With reference to the first possible implementation manner of the third aspect, in a third possible implementation manner of the third aspect, the measurement event 2 specifically includes: signal quality of all WLANs in the serving WLAN group is less than the second threshold.

With reference to the first possible implementation manner of the third aspect, in a fourth possible implementation manner of the third aspect, the measurement event 3 specifically includes:

signal quality of at least one WLAN in the neighboring WLAN group is greater than a sum of signal quality of any WLAN in the serving WLAN group and the third threshold.

With reference to the first possible implementation manner of the third aspect, in a fifth possible implementation manner of the third aspect, the measurement event 4 specifically includes:

signal quality of at least one WLAN in the neighboring WLAN group is greater than the fourth threshold and signal quality of all WLANs in the serving WLAN group is less than the fifth threshold.

With reference to the third aspect and the first to the fifth possible implementation manners of the third aspect, in a sixth possible implementation manner of the third aspect, the user terminal further includes:

an information receiving module, configured to receive the WLAN measurement configuration information sent by the base station.

With reference to the third aspect and the first to the fifth possible implementation manners of the third aspect, in a seventh possible implementation manner of the third aspect, the WLAN measurement configuration information further includes a channel number and/or frequency information of the WLAN; and the information determining module is further configured to measure the at least one WLAN in the WLAN group according to the channel number and/or the frequency information of the WLAN.

With reference to the third aspect and the first to the fifth possible implementation manners of the third aspect, in an eighth possible implementation manner of the third aspect, the WLAN measurement configuration information further includes a measurement report reporting manner and/or a measurement report reporting period; and the result reporting module is specifically configured to:
report the measurement result of the at least one WLAN in the WLAN group to the base station according to the measurement report reporting manner and/or the measurement report reporting period.

With reference to the third aspect and the first to the eighth possible implementation manners of the third aspect, in a ninth possible implementation manner of the third aspect, the measurement result includes a network identifier of a WLAN, and the information reporting module specifically includes:

reporting a network identifier of the at least one WLAN in the WLAN group that satisfies the configured measurement event to the base station.

With reference to the ninth possible implementation manner of the third aspect, in a tenth possible implementation manner of the third aspect, the test result further includes at least one of: a group identifier of a WLAN, signal quality of a WLAN, load of a WLAN, or a transmission rate of a WLAN.

With reference to the tenth possible implementation manner of the third aspect, in an eleventh possible implementation manner of the third aspect, the WLAN measurement configuration information further includes measurement result reporting configuration information, and the reporting configuration information of the measurement result indicates that the user terminal needs to report, to the base station, at least one of: the group identifier of the WLAN, the signal quality of the WLAN, the load of the WLAN, or the transmission rate of the WLAN.

With reference to any one of the first to the eleventh possible implementation manners of the third aspect, in a twelfth possible implementation manner of the third aspect, the signal quality of the WLAN includes at least one of: a received signal strength indicator RSSI, received signal code power RSCP, or a received signal-to-noise ratio indicator RSNI.

With reference to the third aspect and the first to the twelfth possible implementation manners of the third aspect, in a thirteenth possible implementation manner of the third aspect, the WLAN group includes the network identifier of the WLAN.

With reference to the thirteenth possible implementation manner of the third aspect, in a fourteenth possible implementation manner of the third aspect, the WLAN group further includes a group identifier of the WLAN group.

With reference to the third aspect and the first to the fourteenth possible implementation manners of the third aspect, in a fifteenth possible implementation manner of the third aspect, the information acquiring module is specifically configured to:

acquire the WLAN group information from a system message broadcast by the base station.

With reference to the third aspect and the first to the fourteenth possible implementation manners of the third aspect, in a sixteenth possible implementation manner of the third aspect, the information acquiring module is specifically configured to:

acquire the WLAN group information from the WLAN measurement configuration information.

With reference to the third aspect and the first to the fourteenth possible implementation manners of the third aspect, in a seventeenth possible implementation manner of the third aspect, the information acquiring module is specifically configured to:

acquire the WLAN group information from a dedicated radio resource control message, wherein the dedicated radio resource message is sent by the base station and is not the WLAN measurement configuration information.

A fourth aspect of the embodiments of the present invention provides a base station, where the base station includes:

a result receiving module, configured to receive a measurement result that is sent by a user terminal and that is of at least one WLAN in a WLAN group; and a network allocation module, configured to allocate a WLAN to the user terminal according to the measurement result, so that the user terminal is connected to the WLAN.

In some embodiments, when a WLAN measurement event is configured, a WLAN quantity threshold that matches the measurement event and that is necessary for satisfying the measurement event may further be configured.

For example, if a WLAN quantity threshold of the measurement event 1 is 2, a condition to be satisfied for the measurement event 1 is:

the measurement event 1: signal quality of two WLANs in the serving WLAN group is greater than the first threshold.

If a WLAN quantity threshold of the measurement event 2 is 5, a condition to be satisfied for the measurement event 2 is:

the measurement event 2: signal quality of five WLANs in the serving WLAN group is less than the first threshold.

If a serving WLAN quantity threshold of the measurement event 3 is 2, and a neighboring WLAN quantity threshold is 4, a condition to be satisfied for the measurement event 3 is:

the measurement event 3: signal quality of four WLANs in the neighboring WLAN group is greater than a sum of signal quality of either of two WLANs in the serving WLAN group and the third threshold.

If a serving WLAN quantity threshold of the measurement event 4 is 2, and a neighboring WLAN quantity threshold is 4, a condition to be satisfied for the measurement event 4 is:

the measurement event 4: signal quality of four WLANs in the neighboring WLAN group is greater than the fourth threshold and signal quality of two WLANs in the serving WLAN group is less than the fifth threshold.

If a neighboring WLAN quantity threshold of the measurement event 5 is 4, a condition to be satisfied for the measurement event 5 is:

the measurement event 5: signal quality of four WLANs in the neighboring WLAN group is greater than the sixth threshold.

If a neighboring WLAN quantity threshold of the measurement event 6 is 3, a condition to be satisfied for the measurement event 6 is:

the measurement event 6: signal quality of three WLANs in the neighboring WLAN group is less than the seventh threshold.

In a first possible implementation manner of the fourth aspect, the base station further includes:

an information sending module, configured to send WLAN measurement configuration information to the user terminal, so that the user terminal determines whether the at least one WLAN in the WLAN group satisfies the configured measurement event, and the user terminal reports the measurement result of the at least one WLAN in the WLAN group that satisfies the configured measurement event to the base station, when the user terminal determines that the at least one WLAN in the WLAN group satisfies the configured measurement event.

With reference to the first possible implementation manner of the fourth aspect, in a second possible implementation manner of the fourth aspect, the WLAN group includes a serving WLAN group or a neighboring WLAN group, and the WLAN measurement configuration information includes at least one of the following measurement events:

a measurement event 1: signal quality of at least one WLAN in the serving WLAN group is greater than a first threshold;

a measurement event 2: signal quality of at least one WLAN in the serving WLAN group is less than a second threshold;

a measurement event 3: signal quality of at least one WLAN in the neighboring WLAN group is greater than a sum of signal quality of any one of at least one WLAN in the serving WLAN group and a third threshold, where the measurement event 3 has the following four possible forms:

a use case 1: radio signal quality of multiple WLANs in the neighboring WLAN group is greater than a sum of signal quality of one WLAN in the serving WLAN group and the third threshold;

a use case 2: radio signal quality of multiple WLANs in the neighboring WLAN group is greater than a sum of signal quality of any one WLAN of multiple WLANs in the serving WLAN group and the third threshold;

a use case 3: radio signal quality of one WLAN in the neighboring WLAN group is greater than a sum of signal quality of one WLAN in the serving WLAN group and the third threshold; and a use case 4: radio signal quality of one WLAN in the neighboring WLAN group is greater than a sum of signal quality of any one WLAN of multiple WLANs in the serving WLAN group and the third threshold;

a measurement event 4: signal quality of at least one WLAN in the neighboring WLAN group is greater than a fourth threshold and signal quality of at least one WLAN in the serving WLAN group is less than a fifth threshold, where the measurement event 4 has the following four possible forms:

a use case 1: radio signal quality of multiple WLANs in the neighboring WLAN group is greater than the fourth threshold and radio signal quality of one WLAN in the serving WLAN group is less than the fifth threshold;

a use case 2: radio signal quality of one WLAN in the neighboring WLAN group is greater than the fourth threshold and radio signal quality of one WLAN in the serving WLAN group is less than the fifth threshold;

a use case 3: radio signal quality of multiple WLANs in the neighboring WLAN group is greater than the fourth threshold and radio signal quality of multiple WLANs in the serving WLAN group is less than the fifth threshold; and a use case 4: radio signal quality of one WLAN in the neighboring WLAN group is greater than the fourth threshold and radio signal quality of multiple WLANs in the serving WLAN group is less than the fifth threshold;

a measurement event 5: signal quality of at least one WLAN in the neighboring WLAN group is greater than a sixth threshold; or a measurement event 6: signal quality of at least one WLAN in the neighboring WLAN group is less than a seventh threshold, where the serving WLAN group is a WLAN group comprising the WLAN associated with the user terminal, and the neighboring WLAN group is another WLAN group that does not include the WLAN associated with the user terminal. When the UE is not associated with any WLAN, all WLAN groups may be referred to as a neighboring WLAN group.

A fifth aspect of the present disclosure provides a wireless local area network WLAN measurement and reporting apparatus, where the apparatus includes a network interface, a memory, and a processor, where the memory stores a set of program code, and the processor is configured to invoke the program code stored in the memory, to execute the following operations:

acquiring WLAN group information, where the WLAN group information indicates at least one WLAN group;

determining whether at least one WLAN in the WLAN group satisfies a configured measurement event; and reporting a measurement result of the at least one WLAN in the WLAN group to a base station when the at least one WLAN in the WLAN group satisfies the configured measurement event.

In an implementation of the embodiments of the present invention, a user terminal first acquires WLAN group information, where the WLAN group information indicates at least one WLAN group; then determines whether at least one WLAN in the WLAN group satisfies a configured measurement event; and finally reports a measurement result of the at least one WLAN in the WLAN group to a base station when the at least one WLAN in the WLAN group satisfies the configured measurement event, thereby saving a signaling resource, and reducing signaling load caused by simultaneous reporting of a large quantity of WLAN measurement results.

For all the foregoing implementation manners, in some embodiments, when a WLAN measurement event is configured, a WLAN quantity threshold that matches the measurement event and that is necessary for satisfying the measurement event may further be configured.

For example, if a WLAN quantity threshold of the measurement event 1 is 2, a condition to be satisfied for the measurement event 1 is:

the measurement event 1: signal quality of two WLANs in the serving WLAN group is greater than the first threshold.

If a WLAN quantity threshold of the measurement event 2 is 5, a condition to be satisfied for the measurement event 2 is:

the measurement event 2: signal quality of five WLANs in the serving WLAN group is less than the first threshold.

If a serving WLAN quantity threshold of the measurement event 3 is 2, and a neighboring WLAN quantity threshold is 4, a condition to be satisfied for the measurement event 3 is:

the measurement event 3: signal quality of four WLANs in the neighboring WLAN group is greater than a sum of signal quality of either of two WLANs in the serving WLAN group and the third threshold.

If a serving WLAN quantity threshold of the measurement event 4 is 2, and a neighboring WLAN quantity threshold is 4, a condition to be satisfied for the measurement event 4 is:

the measurement event 4: signal quality of four WLANs in the neighboring WLAN group is greater than the fourth threshold and signal quality of two WLANs in the serving WLAN group is less than the fifth threshold.

If a neighboring WLAN quantity threshold of the measurement event 5 is 4, a condition to be satisfied for the measurement event 5 is:

the measurement event 5: signal quality of four WLANs in the neighboring WLAN group is greater than the sixth threshold.

If a neighboring WLAN quantity threshold of the measurement event 6 is 3, a condition to be satisfied for the measurement event 6 is:

the measurement event 6: signal quality of three WLANs in the neighboring WLAN group is less than the seventh threshold.

For all the foregoing implementation manners, when multiple WLANs need to be selected from a group to which a neighboring WLAN belongs for comparison, a selection rule may be random selection, or multiple WLANs with the best radio signal quality are selected, or multiple WLANs with the worst radio signal quality are selected, or all WLANs in the group are selected.

When one WLAN needs to be selected from a group to which a neighboring WLAN belongs for comparison, a selection rule may be random selection, or one WLAN with the best radio signal quality is selected, or one WLAN with the worst radio signal quality is selected.

When multiple WLANs need to be selected from a group to which a serving WLAN belongs for comparison, a selection rule may be random selection, or multiple WLANs with the best radio signal quality are selected, or multiple WLANs with the worst radio signal quality are selected, or all WLANs in the group are selected.

When one WLAN needs to be selected from a group to which a serving WLAN belongs for comparison, a selection rule may be random selection, or one WLAN with the best radio signal quality is selected, or a WLAN with the worst radio signal quality is selected, or the serving WLAN is directly selected.

It should be noted that, the present disclosure can be applied to LTE-WLAN aggregation, LTE-WLAN interworking, and all other scenarios in which UE needs to measure a WLAN according to an indication of a mobile communications network. The mobile communications network is not limited to an LTE network, and may be another communications network, such as GSM, UMTS, CDMA, or WiMax. For brevity, the present disclosure is described by using only an LTE system as an example.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present disclosure.

Figure 3:
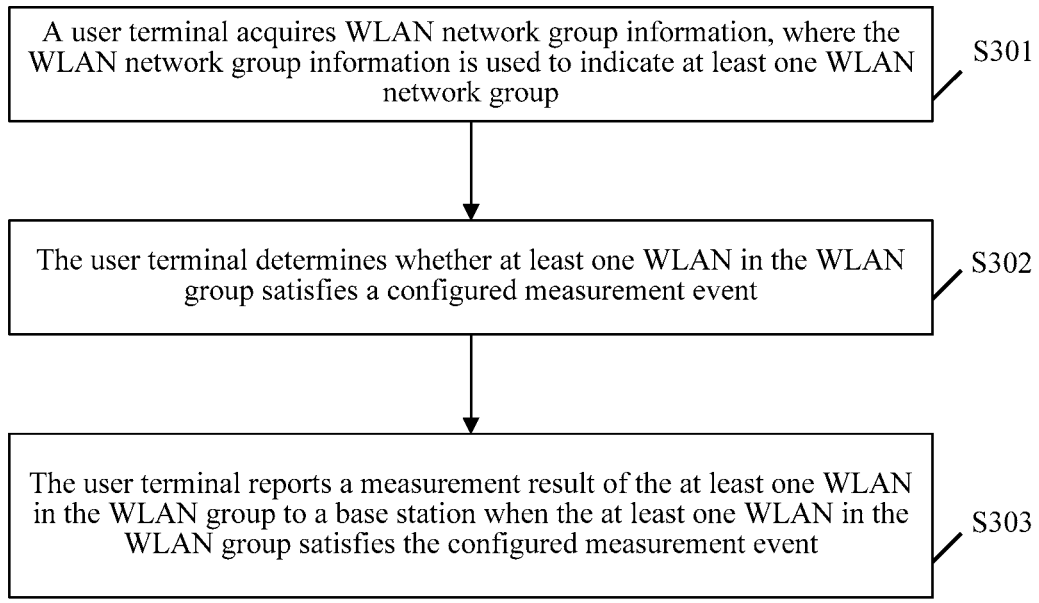
FIG. 3 is a schematic flowchart of a wireless local area network WLAN measurement and reporting method according to a first embodiment of the present invention.

Referring to FIG. 3, FIG. 3 is a schematic flowchart of a wireless local area network WLAN measurement and reporting method according to a first embodiment of the present invention. As shown in the figure, the method in this embodiment of the present invention includes:

S301. A user terminal acquires WLAN group information, where the WLAN group information indicates at least one WLAN group.

In a specific implementation, the user terminal may acquire the WLAN group information from a system message broadcast by a base station. First, the base station broadcasts a system message in a cell managed by the base station, where the system message includes WLAN group information; then, when user equipment detects that the user equipment enters the cell managed by the base station, the user equipment acquires the WLAN group information by reading the system message of the cell. The WLAN group information includes a network identifier of a WLAN. In some embodiments, the WLAN group information further includes a group identifier of the WLAN group, and a frequency or a channel number of the WALN network. For example, the WLAN group information may include the following grouping manners:

A first grouping manner:
group identifier 1, BSSID 1, BSSID 2, BSSID 3;
group identifier 2, BSSID 3, BSSID 4, BSSID 5, BSSID 6;
group identifier 3, BSSID 7;
group identifier 4, channel number=10, BSSID 1, BSSID 2, BSSID 4;
group identifier 5, frequency=3.5 GHz, BSSID 3, BSSID 4, BSSID 5;
. . . .

A second grouping manner:
channel number 1 or frequency 1
group identifier 1, BSSID 1, BSSID 2, BSSID 3;
group identifier 2, BSSID 3, BSSID 4, BSSID 5, BSSID 6;
group identifier 3, BSSID 7;
channel number 2 or frequency 2
group identifier 1, BSSID 1, BSSID 2, BSSID 3;
group identifier 2, BSSID 3, BSSID 4, BSSID 5.

In some embodiments, the user terminal may acquire the WLAN group information from the WLAN measurement configuration information. In this method, grouping may be performed in the following manner.

A WLAN measurement configuration message sent by an eNB to UE includes a measurement parameter such as a measurement event, and also includes measurement object information. The measurement object information includes the WLAN group information. The measurement object information may be a WLAN list that includes at least one WLAN group identifier.

For example, the eNB may configure, in the measurement configuration message, one or more of the following measurement objects for the UE:
measurement object identifier 1, BSSID 1, BSSID 2, BSSID 3;
measurement object identifier 2, BSSID 3, BSSID 4, BSSID 5, BSSID 6;
measurement object identifier 3, BSSID 7;
measurement object identifier 4, channel number=10, BSSID 1, BSSID 2, BSSID 4;
measurement object identifier 5, frequency=3.5 GHz, BSSID 3, BSSID 4, BSSID 5;
. . . .

Certainly, the present disclosure does not exclude the following measurement object configuration manner:
measurement object identifier 1
channel number 1 or frequency 1 group identifier 1, BSSID 1, BSSID 2, BSSID 3;
group identifier 2, BSSID 3, BSSID 4, BSSID 5, BSSID 6;
group identifier 3, BSSID 7;
measurement object identifier 2
channel number 2 or frequency 2
group identifier 1, BSSID 1, BSSID 2, BSSID 3;
group identifier 2, BSSID 4, BSSID 5, BSSID 6;
. . . .

It should be noted that, for brevity, all the embodiments provided herein are described by using a BSSID as an identifier of a WLAN. In an actual implementation process, an SSID, or an (H)ESSID may also be used as an identifier of a WLAN.

In some embodiments, the user terminal may acquire the WLAN group information from a dedicated radio resource control message, wherein the dedicated radio resource message is sent by the base station and is not the WLAN measurement configuration information. For example: WLAN group information is added to an LWA configuration message, and grouping may be performed in the first or the second grouping manner described above.

In some embodiments, if the system message broadcast by the base station includes the WLAN group information, the WLAN measurement configuration information may need to carry only the group identifier of the WLAN group, so that the user terminal acquires the group identifier of the WLAN group from the WLAN measurement configuration information, and it is unnecessary to list network identifiers of WLANs, thereby saving a signaling resource.

In some embodiments, if the system message broadcast by the base station includes the WLAN group information, the another dedicated radio resource control message may need to carry only the group identifier of the WLAN group, so that the user terminal acquires the group identifier of the WLAN group from the another dedicated radio resource control message, and it is unnecessary to list network identifiers of WLANs, thereby saving a signaling resource.

S302. The user terminal determines whether at least one WLAN in the WLAN group satisfies a configured measurement event.

In a specific implementation, before acquiring the WLAN group information, the user terminal may receive the WLAN measurement configuration information sent by the base station, and satisfying the WLAN measurement configuration information may be satisfying the measurement event. The WLAN group includes a serving WLAN group and/or a neighboring WLAN group. The WLAN measurement configuration information includes at least one of the following measurement events:

a measurement event 1: signal quality of at least one WLAN in the serving WLAN group is greater than a first threshold;

a measurement event 2: signal quality of at least one WLAN in the serving WLAN group is less than a second threshold;

a measurement event 3: signal quality of at least one WLAN in the neighboring WLAN group is greater than a sum of signal quality of any one of at least one WLAN in the serving WLAN group and a third threshold, where the measurement event 3 has the following four possible forms:

a use case 1: radio signal quality of multiple WLANs in the neighboring WLAN group is greater than a sum of signal quality of one WLAN in the serving WLAN group and the third threshold;

a use case 2: radio signal quality of multiple WLANs in the neighboring WLAN group is greater than a sum of signal quality of any one WLAN of multiple WLANs in the serving WLAN group and the third threshold;

a use case 3: radio signal quality of one WLAN in the neighboring WLAN group is greater than a sum of signal quality of one WLAN in the serving WLAN group and the third threshold; and a use case 4: radio signal quality of one WLAN in the neighboring WLAN group is greater than a sum of signal quality of any one WLAN of multiple WLANs in the serving WLAN group and the third threshold;

a measurement event 4: signal quality of at least one WLAN in the neighboring WLAN group is greater than a fourth threshold and signal quality of at least one WLAN in the serving WLAN group is less than a fifth threshold, where the measurement event 4 has the following four possible forms:

a use case 1: radio signal quality of multiple WLANs in the neighboring WLAN group is greater than the fourth threshold and radio signal quality of one WLAN in the serving WLAN group is less than the fifth threshold;

a use case 2: radio signal quality of one WLAN in the neighboring WLAN group is greater than the fourth threshold and radio signal quality of one WLAN in the serving WLAN group is less than the fifth threshold;

a use case 3: radio signal quality of multiple WLANs in the neighboring WLAN group is greater than the fourth threshold and radio signal quality of multiple WLANs in the serving WLAN group is less than the fifth threshold; and a use case 4: radio signal quality of one WLAN in the neighboring WLAN group is greater than the fourth threshold and radio signal quality of multiple WLANs in the serving WLAN group is less than the fifth threshold;

a measurement event 5: signal quality of at least one WLAN in the neighboring WLAN group is greater than a sixth threshold; or a measurement event 6: signal quality of at least one WLAN in the neighboring WLAN group is less than a seventh threshold, where the serving WLAN group is a WLAN group comprising the WLAN associated with the user terminal, and the neighboring WLAN group is another WLAN group that does not include the WLAN associated with the user terminal. When the UE is not associated with any WLAN, all WLAN groups may be referred to as a neighboring WLAN group.

The measurement event 1 specifically includes: signal quality of all WLANs in the serving WLAN group is greater than the first threshold.

The measurement event 2 specifically includes: signal quality of all WLANs in the serving WLAN group is less than the second threshold.

The measurement event 3 specifically includes: signal quality of at least one WLAN in the neighboring WLAN group is greater than a sum of signal quality of any WLAN in the serving WLAN group and the third threshold.

The measurement event 4 specifically includes: signal quality of at least one WLAN in the neighboring WLAN group is greater than the fourth threshold and signal quality of all WLANs in the serving WLAN group is less than the fifth threshold.

It should be noted that the serving WLAN group may be applied to the measurement event 1, the measurement event 2, the measurement event 3, and the measurement event 4; and the neighboring WLAN group is applied to the event s: the measurement event 3, the measurement event 4, the measurement event 5, and the measurement event 6. Moreover, the first threshold in the measurement event 1 may be −80 dB, the second threshold in the measurement event 2 may be 100 dB, and the third threshold in the measurement event 3 may be +3 dB, and the like, but values are not limited to the foregoing values.

In some embodiments, different measurement event s may be configured for a same WLAN group (measurement object), or a same measurement event may be configured for different WLAN groups (measurement objects). A WLAN group (measurement object) is associated with a measurement event by using a measurement identifier. A correspondence is shown as follows:

measurement identifier 1:
  group identifier: WLAN group 1 or measurement object 1,
    measurement event: event 2, event 3;
measurement identifier 2:
  group identifier: WLAN group 1 or measurement object 1,
    measurement event: event 4;
measurement identifier 3:
  group identifier: WLAN group 2 or measurement object 2,
    measurement event: event 4.

For example: when the user terminal determines that the measurement identifier is measurement identifier 2, the user terminal may choose to measure WLAN group 1, and determine whether at least one WLAN in WLAN group 1 satisfies event 4. When the user terminal determines that the measurement identifier is measurement identifier 3, the user terminal chooses to measure WLAN group 2, and determines whether at least one WLAN in WLAN group 2 satisfies event 4.

In some embodiments, the WLAN measurement configuration information further includes a channel number and/or frequency information of the WLAN. The user terminal measures the at least one WLAN in the WLAN group according to the channel number and/or the frequency information of the WLAN. For example: in the second grouping manner described above, if the channel number and/or the frequency information of the WLAN is channel number 2 or frequency 2, the user terminal measures the at least one WLAN in the WLAN group according to that group identifier 1 corresponds to BSSID 1, BSSID 2, and BSSID 3, and that group identifier 2 corresponds to BSSID 3, BSSID 4, and BSSID 5.

In some embodiments, the WLAN measurement configuration information further includes measurement quantity information, where the measurement quantity information indicates signal quality of the WLAN that needs to be measured by the user terminal. The signal quality of the WLAN includes at least one of: a received signal strength indicator RSSI, received signal code power RSCP, or a received signal-to-noise ratio indicator RSNI.

In some embodiments, when a WLAN measurement event is configured, a WLAN quantity threshold that matches the measurement event and that is necessary for satisfying the measurement event may further be configured.

For example, if a WLAN quantity threshold of the measurement event 1 is 2, a condition to be satisfied for the measurement event 1 is:
  the measurement event 1: signal quality of two WLANs in the serving WLAN group is greater than the first threshold.

If a WLAN quantity threshold of the measurement event 2 is 5, a condition to be satisfied for the measurement event 2 is:
  the measurement event 2: signal quality of five WLANs in the serving WLAN group is less than the first threshold.

If a serving WLAN quantity threshold of the measurement event 3 is 2, and a neighboring WLAN quantity threshold is 4, a condition to be satisfied for the measurement event 3 is:
  the measurement event 3: signal quality of four WLANs in the neighboring WLAN group is greater than a sum of signal quality of either of two WLANs in the serving WLAN group and the third threshold.

If a serving WLAN quantity threshold of the measurement event 4 is 2, and a neighboring WLAN quantity threshold is 4, a condition to be satisfied for the measurement event 4 is:
  the measurement event 4: signal quality of four WLANs in the neighboring WLAN group is greater than the fourth threshold and signal quality of two WLANs in the serving WLAN group is less than the fifth threshold.

If a neighboring WLAN quantity threshold of the measurement event 5 is 4, a condition to be satisfied for the measurement event 5 is:
  the measurement event 5: signal quality of four WLANs in the neighboring WLAN group is greater than the sixth threshold.

If a neighboring WLAN quantity threshold of the measurement event 6 is 3, a condition to be satisfied for the measurement event 6 is:
  the measurement event 6: signal quality of three WLANs in the neighboring WLAN group is less than the seventh threshold.

S303. The user terminal reports a measurement result of the at least one WLAN in the WLAN group to a base station when the at least one WLAN in the WLAN group satisfies the configured measurement event.

In a specific implementation, the measurement result includes a network identifier of a WLAN. The user terminal may report a network identifier of the at least one WLAN in the WLAN group that satisfies the configured measurement event to the base station, or may report network identifiers of all WLANs in the WLAN group that satisfy the configured measurement event to the base station. When no WLAN in the WLAN group satisfies the configured measurement event, the user terminal continues to measure at least one WLAN in the WLAN group, and determines whether the at least one WLAN in the WLAN group satisfies the configured measurement event.

In some embodiments, the test result further includes at least one of: a group identifier of a WLAN, signal quality of a WLAN, load of a WLAN, or a transmission rate of a WLAN. The WLAN measurement configuration information further includes measurement result reporting configuration information, and the reporting configuration information of the measurement resultindicates that the user terminal needs to report, to the base station, at least one of: the group identifier of the WLAN, the signal quality of the WLAN, the load of the WLAN, or the transmission rate of the WLAN.

Further, in some embodiments, different measurement results may be reported according to that the at least one WLAN in the WLAN group satisfies different measurement events. For example: when at least one WLAN in the serving WLAN group satisfies the measurement event 1, a network identifier of the at least one WLAN that satisfies the measurement event 1 or network identifiers of all WLANs in the serving WLAN group and signal quality of the at least one or all the WLANs may be reported. When at least one WLAN in the serving WLAN group and at least one WLAN in the neighboring WLAN group satisfy the measurement event 3, network identifiers of all WLANs in the serving WLAN group and signal quality of all the WLANs may be reported, and a network identifier of the at least one WLAN that satisfies the measurement event 3 or network identifiers of all WLANs in the neighboring WLAN group, and signal quality of the at least one or all the WLANs are reported.

In some embodiments, the WLAN measurement configuration information further includes a measurement report reporting manner and/or a measurement report reporting period. The user terminal reports the measurement result of the at least one WLAN in the WLAN group to the base station according to the measurement report reporting manner and/or the measurement report reporting period. For example, reporting may be performed based on an event, or reporting is performed first based on an event and then periodically, or reporting is performed periodically. Event-based reporting is: when the at least one WLAN in the WLAN group satisfies one measurement event, reporting is performed once. Reporting performed first based on an event and then periodically is: when the at least one WLAN in the WLAN group satisfies one measurement event, reporting is performed once, and then periodical reporting is started. Reporting performed periodically is: when the at least one WLAN in the WLAN group satisfies one measurement event, periodical reporting is started. The measurement report reporting period may be 100 ms or 200 ms, but is not limited to the foregoing time.

In this embodiment of the present invention, a user terminal first acquires WLAN group information, where the WLAN group information indicates at least one WLAN group; then determines whether at least one WLAN in the WLAN group satisfies a configured measurement event; and finally reports a measurement result of the at least one WLAN in the WLAN group to a base station when the at least one WLAN in the WLAN group satisfies the configured measurement event, thereby saving a signaling resource, and reducing signaling load caused by simultaneous reporting of a large quantity of WLAN measurement results.

Figure 4:
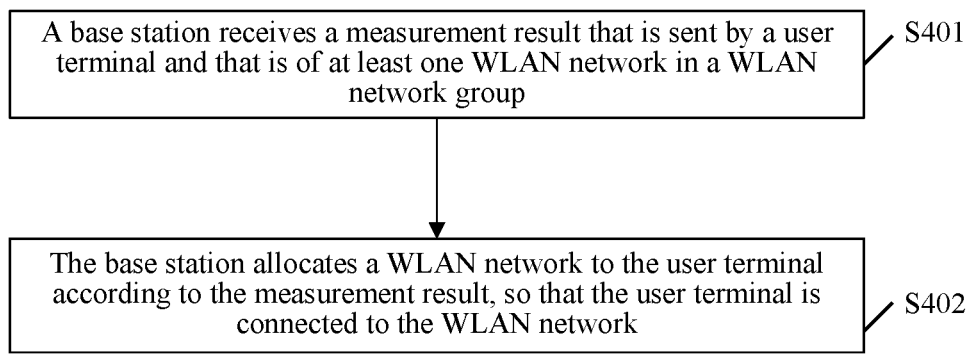
FIG. 4 is a schematic flowchart of a wireless local area network WLAN measurement and reporting method according to a second embodiment of the present invention.

Referring to FIG. 4, FIG. 4 is a schematic flowchart of a wireless local area network WLAN measurement and reporting method according to a second embodiment of the present invention. As shown in the figure, the method in this embodiment of the present invention includes:

S401. A base station receives a measurement result that is sent by a user terminal and that is of at least one WLAN in a WLAN group.

In a specific implementation, the user terminal first acquires WLAN group information, where the WLAN group information indicates at least one WLAN group; then the user terminal determines whether the at least one WLAN in the WLAN group satisfies a configured measurement event; and finally the user terminal reports the measurement result of the at least one WLAN in the WLAN group to the base station when the at least one WLAN in the WLAN group satisfies the configured measurement event. The base station receives the measurement result that is sent by the user terminal and that is of the at least one WLAN in the WLAN group.

In some embodiments, before receiving the measurement result that is sent by the user terminal and that is of the at least one WLAN in the WLAN group, the base station sends WLAN measurement configuration information to the user terminal. The WLAN group includes a serving WLAN group and/or a neighboring WLAN group. The WLAN measurement configuration information includes at least one of the following measurement events:

a measurement event 1: signal quality of at least one WLAN in the serving WLAN group is greater than a first threshold;

a measurement event 2: signal quality of at least one WLAN in the serving WLAN group is less than a second threshold;

a measurement event 3: signal quality of at least one WLAN in the neighboring WLAN group is greater than a sum of signal quality of any one of at least one WLAN in the serving WLAN group and a third threshold, where the measurement event 3 has the following four possible forms:

a use case 1: radio signal quality of multiple WLANs in the neighboring WLAN group is greater than a sum of signal quality of one WLAN in the serving WLAN group and the third threshold;

a use case 2: radio signal quality of multiple WLANs in the neighboring WLAN group is greater than a sum of signal quality of any one WLAN of multiple WLANs in the serving WLAN group and the third threshold;

a use case 3: radio signal quality of one WLAN in the neighboring WLAN group is greater than a sum of signal quality of one WLAN in the serving WLAN group and the third threshold; and a use case 4: radio signal quality of one WLAN in the neighboring WLAN group is greater than a sum of signal quality of any one WLAN of multiple WLANs in the serving WLAN group and the third threshold;

a measurement event 4: signal quality of at least one WLAN in the neighboring WLAN group is greater than a fourth threshold and signal quality of at least one WLAN in the serving WLAN group is less than a fifth threshold, where the measurement event 4 has the following four possible forms:

a use case 1: radio signal quality of multiple WLANs in the neighboring WLAN group is greater than the fourth threshold and radio signal quality of one WLAN in the serving WLAN group is less than the fifth threshold;

a use case 2: radio signal quality of one WLAN in the neighboring WLAN group is greater than the fourth threshold and radio signal quality of one WLAN in the serving WLAN group is less than the fifth threshold;

a use case 3: radio signal quality of multiple WLANs in the neighboring WLAN group is greater than the fourth threshold and radio signal quality of multiple WLANs in the serving WLAN group is less than the fifth threshold; and a use case 4: radio signal quality of one WLAN in the neighboring WLAN group is greater than the fourth threshold and radio signal quality of multiple WLANs in the serving WLAN group is less than the fifth threshold;

a measurement event 5: signal quality of at least one WLAN in the neighboring WLAN group is greater than a sixth threshold; or a measurement event 6: signal quality of at least one WLAN in the neighboring WLAN group is less than a seventh threshold, where the serving WLAN group is a WLAN group comprising the WLAN associated with the user terminal, and the neighboring WLAN group is another WLAN group that does not include the WLAN associated with the user terminal. When the UE is not associated with any WLAN, all WLAN groups may be referred to as a neighboring WLAN group.

The measurement event 1 specifically includes: signal quality of all WLANs in the serving WLAN group is greater than the first threshold.

The measurement event 2 specifically includes: signal quality of all WLANs in the serving WLAN group is less than the second threshold.

The measurement event 3 specifically includes: signal quality of at least one WLAN in the neighboring WLAN group is greater than a sum of signal quality of any WLAN in the serving WLAN group and the third threshold.

The measurement event 4 specifically includes: signal quality of at least one WLAN in the neighboring WLAN group is greater than the fourth threshold and signal quality of all WLANs in the serving WLAN group is less than the fifth threshold.

It should be noted that the serving WLAN group may be applied to the measurement event 1, the measurement event 2, the measurement event 3, and the measurement event 4; and the neighboring WLAN group is applied to the events: the measurement event 3, the measurement event 4, the measurement event 5, and the measurement event 6. Moreover, the first threshold in the measurement event 1 may be −80 dB, the second threshold in the measurement event 2 may be 100 dB, and the third threshold in the measurement event 3 may be +3 dB, and the like, but values are not limited to the foregoing values.

In some embodiments, the measurement result includes a network identifier of a WLAN. The base station may receive a network identifier, sent by the user terminal, of the at least one WLAN in the WLAN group that satisfies a configured measurement event, or may receive network identifiers of all WLANs in the WLAN group that are sent by the user terminal.

In some embodiments, the test result further includes a group identifier of a WLAN, signal quality of a WLAN, load of a WLAN, or a transmission rate of a WLAN. The WLAN measurement configuration information further includes measurement result reporting configuration information, and the reporting configuration information of the measurement result indicates that the user terminal needs to report, to the base station, at least one of: the group identifier of the WLAN, the signal quality of the WLAN, the load of the WLAN, or the transmission rate of the WLAN, so that the base station can receive at least one of: the signal quality of the WLAN, the load of the WLAN, or the transmission rate of the WLAN that is sent by the user terminal.

S402. The base station allocates a WLAN to the user terminal according to the measurement result, so that the user terminal is connected to the WLAN.

Figure 1:
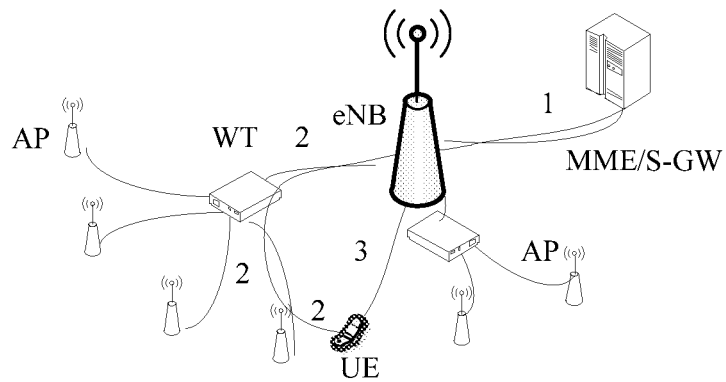
FIG. 1 is a schematic diagram of a network architecture of LWA in an existing technical solution.
Figure 2:
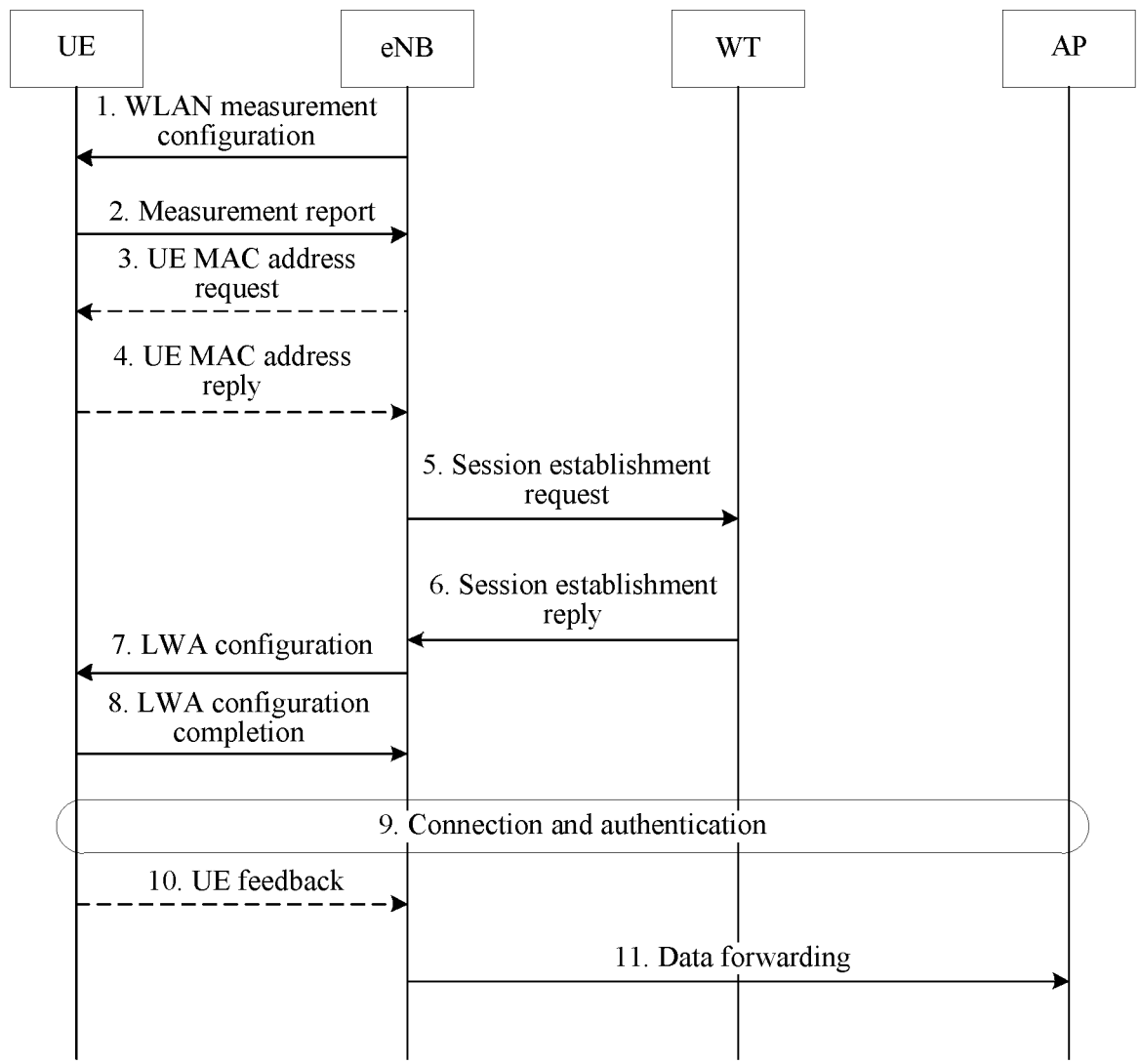
FIG. 2 is a schematic flowchart of a specific implementation manner of LWA in an existing technical solution.

In a specific implementation, as shown in FIG. 2, after receiving the measurement result sent by the user terminal, the base station sends a request message to the user terminal. The user terminal sends, to the base station according to the request message, a MAC address used by the user terminal in the WLAN. Then the base station sends a session establishment request message to a WT, to trigger the WT to establish a session path for a bearer of the user terminal, so that the WT replies the base station with a session establishment response message. Then the base station sends an LWA configuration message to user equipment, where the LWA configuration message is used to instruct the user equipment to start LWA, and the LWA configuration message carries an identifier of at least one WLAN to which the user terminal can be connected. Finally, the user terminal replies the base station with an LWA configuration completion message, and initiates a connection process and an authentication process to an AP according to one selected WLAN identifier in the identifier of the at least one WLAN, thereby establishing a network connection with the AP.

In this embodiment of the present invention, a user terminal first acquires WLAN group information, where the WLAN group information indicates at least one WLAN group; then determines whether at least one WLAN in the WLAN group satisfies a configured measurement event; and finally reports a measurement result of the at least one WLAN in the WLAN group to a base station when the at least one WLAN in the WLAN group satisfies the configured measurement event, thereby saving a signaling resource, and reducing signaling load caused by simultaneous reporting of a large quantity of WLAN measurement results.

Figure 5:
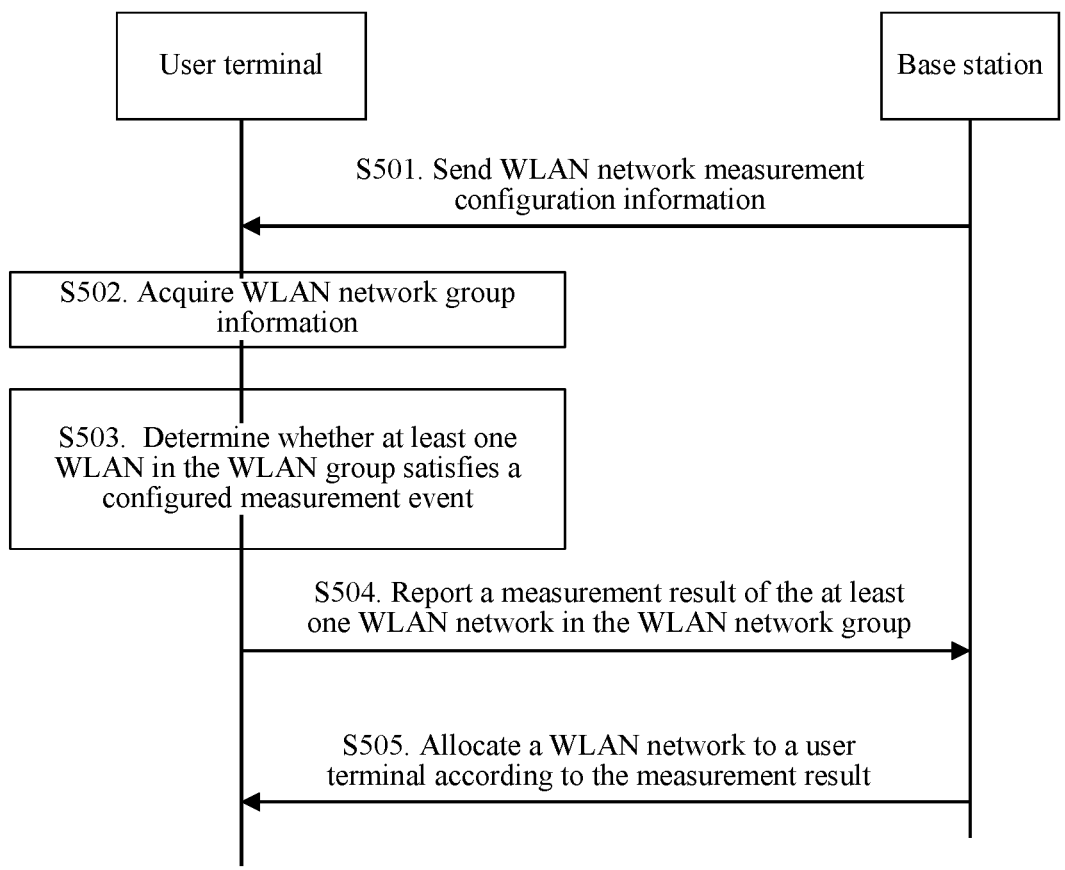
FIG. 5 is a schematic flowchart of a wireless local area network WLAN measurement and reporting method according to a third embodiment of the present invention.

Referring to FIG. 5, FIG. 5 is a schematic flowchart of a wireless local area network WLAN measurement reporting method according to a third embodiment of the present invention. As shown in the figure, the method in this embodiment of the present invention includes:

S501. A base station sends WLAN measurement configuration information to a user terminal.

S502. The user terminal acquires WLAN group information, where the WLAN group information indicates at least one WLAN group.

In a specific implementation, the user terminal may acquire the WLAN group information from a system message broadcast by the base station. First, the base station broadcasts a system message in a cell managed by the base station, where the system message includes WLAN group information; then, when user equipment detects that the user equipment enters the cell managed by the base station, the user equipment acquires the WLAN group information by reading the system message of the cell. The WLAN group information includes a network identifier of a WLAN. In some embodiments, the WLAN group information further includes a group identifier of the WLAN group, and a frequency or a channel number of the WALN network. For example, the WLAN group information may include the following grouping manners:

A first grouping manner:
group identifier 1, BSSID 1, BSSID 2, BSSID 3;
group identifier 2, BSSID 3, BSSID 4, BSSID 5, BSSID 6;
group identifier 3, BSSID 7;
group identifier 2, channel number=10, BSSID 1, BSSID 2, BSSID 4;
group identifier 5, frequency=3.5 GHz, BSSID 3, BSSID 4, BSSID 5;
. . . .

A second grouping manner:
channel number 1 or frequency 1
group identifier 1, BSSID 1, BSSID 2, BSSID 3;
group identifier 2, BSSID 3, BSSID 4, BSSID 5, BSSID 6;
group identifier 3, BSSID 7;
channel number 2 or frequency 2
group identifier 1, BSSID 1, BSSID 2, BSSID 3;
group identifier 2, BSSID 3, BSSID 4, BSSID 5.

In some embodiments, the user terminal may acquire the WLAN group information from the WLAN measurement configuration information. Grouping may be performed in the following manner.

A WLAN measurement configuration message sent by an eNB to UE includes a measurement parameter such as a measurement event, and also includes measurement object information. The measurement object information includes the WLAN group information. The measurement object information may be a WLAN list that includes at least one WLAN group identifier.

For example, the eNB may configure, in the measurement configuration message, one or more of the following measurement objects for the UE:

measurement object identifier 1, BSSID 1, BSSID 2, BSSID 3;

measurement object identifier 2, BSSID 3, BSSID 4, BSSID 5, BSSID 6;

measurement object identifier 3, BSSID7;

measurement object identifier 4, channel number=10, BSSID 1, BSSID 2, BSSID 4;

measurement object identifier 5, frequency=3.5 GHz, BSSID 3, BSSID 4, BSSID 5;

. . . .

Certainly, the present disclosure does not exclude the following measurement object configuration manner:

measurement object identifier 1
channel number 1 or frequency 1
  group identifier 1, BSSID 1, BSSID 2, BSSID 3;
  group identifier 2, BSSID 3, BSSID 4, BSSID 5, BSSID 6;
  group identifier 3, BSSID 7;
measurement object identifier 2
channel number 2 or frequency 2
  group identifier 1, BSSID 1, BSSID 2, BSSID 3;
  group identifier 2, BSSID 4, BSSID 5, BSSID 6;

. . . .

It should be noted that, for brevity, all the embodiments of the present invention are described by using a BSSID as an identifier of a WLAN. In an actual implementation process, an SSID, or an (H)ESSID may also be used as an identifier of a WLAN.

In some embodiments, the user terminal may acquire the WLAN group information from a dedicated radio resource control message, wherein the dedicated radio resource message is sent by the base station and is not the WLAN measurement configuration information. For example: WLAN group information is added to an LWA configuration message, and grouping may be performed in the foregoing grouping manners.

In some embodiments, if the system message broadcast by the base station includes the WLAN group information, the WLAN measurement configuration information may need to carry only the group identifier of the WLAN group, so that the user terminal acquires the group identifier of the WLAN group from the WLAN measurement configuration information, and it is unnecessary to list network identifiers of WLANs, thereby saving a signaling resource.

In some embodiments, if the system message broadcast by the base station includes the WLAN group information, the another dedicated radio resource control message may need to carry only the group identifier of the WLAN group, so that the user terminal acquires the group identifier of the WLAN group from the another dedicated radio resource control message, and it is unnecessary to list network identifiers of WLANs, thereby saving a signaling resource.

S503. The user terminal determines whether at least one WLAN in the WLAN group satisfies a configured measurement event.

In a specific implementation, satisfying the WLAN measurement configuration information may be satisfying the measurement event. The WLAN group includes a serving WLAN group and/or a neighboring WLAN group. The WLAN measurement configuration information includes at least one of the following measurement events:

a measurement event 1: signal quality of at least one WLAN in the serving WLAN group is greater than a first threshold;

a measurement event 2: signal quality of at least one WLAN in the serving WLAN group is less than a second threshold;

a measurement event 3: signal quality of at least one WLAN in the neighboring WLAN group is greater than a sum of signal quality of any one of at least one WLAN in the serving WLAN group and a third threshold, where the measurement event 3 has the following four possible forms:

a use case 1: radio signal quality of multiple WLANs in the neighboring WLAN group is greater than a sum of signal quality of one WLAN in the serving WLAN group and the third threshold;

a use case 2: radio signal quality of multiple WLANs in the neighboring WLAN group is greater than a sum of signal quality of any one WLAN of multiple WLANs in the serving WLAN group and the third threshold;

a use case 3: radio signal quality of one WLAN in the neighboring WLAN group is greater than a sum of signal quality of one WLAN in the serving WLAN group and the third threshold; and a use case 4: radio signal quality of one WLAN in the neighboring WLAN group is greater than a sum of signal quality of any one WLAN of multiple WLANs in the serving WLAN group and the third threshold;

a measurement event 4: signal quality of at least one WLAN in the neighboring WLAN group is greater than a fourth threshold and signal quality of at least one WLAN in the serving WLAN group is less than a fifth threshold, where the measurement event 4 has the following four possible forms:

a use case 1: radio signal quality of multiple WLANs in the neighboring WLAN group is greater than the fourth threshold and radio signal quality of one WLAN in the serving WLAN group is less than the fifth threshold;

a use case 2: radio signal quality of one WLAN in the neighboring WLAN group is greater than the fourth threshold and radio signal quality of one WLAN in the serving WLAN group is less than the fifth threshold;

a use case 3: radio signal quality of multiple WLANs in the neighboring WLAN group is greater than the fourth threshold and radio signal quality of multiple WLANs in the serving WLAN group is less than the fifth threshold; and a use case 4: radio signal quality of one WLAN in the neighboring WLAN group is greater than the fourth threshold and radio signal quality of multiple WLANs in the serving WLAN group is less than the fifth threshold;

a measurement event 5: signal quality of at least one WLAN in the neighboring WLAN group is greater than a sixth threshold; or a measurement event 6: signal quality of at least one WLAN in the neighboring WLAN group is less than a seventh threshold, where the serving WLAN group is a WLAN group comprising the WLAN associated with the user terminal, and the neighboring WLAN group is another WLAN group that does not include the WLAN associated with the user terminal. When the UE is not associated with any WLAN, all WLAN groups may be referred to as a neighboring WLAN group.

The measurement event 1 specifically includes: signal quality of all WLANs in the serving WLAN group is greater than the first threshold.

The measurement event 2 specifically includes: signal quality of all WLANs in the serving WLAN group is less than the second threshold.

The measurement event 3 specifically includes: signal quality of at least one WLAN in the neighboring WLAN group is greater than a sum of signal quality of any WLAN in the serving WLAN group and the third threshold.

The measurement event 4 specifically includes: signal quality of at least one WLAN in the neighboring WLAN group is greater than the fourth threshold and signal quality of all WLANs in the serving WLAN group is less than the fifth threshold.

It should be noted that the serving WLAN group may be applied to the measurement event 1, the measurement event 2, the measurement event 3, and the measurement event 4; and the neighboring WLAN group is applied to the events: the measurement event 3, the measurement event 4, the measurement event 5, and the measurement event 6. Moreover, the first threshold in the measurement event 1 may be −80 dB, the second threshold in the measurement event 2 may be 100 dB, and the third threshold in the measurement event 3 may be +3 dB, and the like, but values are not limited to the foregoing values.

In some embodiments, different measurement events may be configured for a same WLAN group (measurement object), or a same measurement event may be configured for different WLAN groups (measurement objects). A WLAN group (measurement object) is associated with a measurement event by using a measurement identifier. A correspondence between group identifiers and measurement events is shown as follow:

measurement identifier 1:
group identifier: WLAN group 1 or measurement object 1,
measurement event: event 2, event 3;
measurement identifier 2:
group identifier: WLAN group 1 or measurement object 1,
measurement event: event 4;
measurement identifier 3:
group identifier: WLAN group 2 or measurement object 2,
measurement event: event 4.

For example: when the user terminal determines that the measurement identifier is measurement identifier 2, the user terminal may choose to measure WLAN group 1, and determine whether at least one WLAN in WLAN group 1 satisfies event 4. When the user terminal determines that the measurement identifier is measurement identifier 3, the user terminal chooses to measure WLAN group 2, and determines whether at least one WLAN in WLAN group 2 satisfies event 4.

In some embodiments, the WLAN measurement configuration information further includes a channel number and/or frequency information of the WLAN. The user terminal measures the at least one WLAN in the WLAN group according to the channel number and/or the frequency information of the WLAN. For example: in the second grouping manner described above, if the channel number and/or the frequency information of the WLAN is channel number 2 or frequency 2, the user terminal measures the at least one WLAN in the WLAN group according to that group identifier 1 corresponds to BSSID 1, BSSID 2, and BSSID 3, and that group identifier 2 corresponds to BSSID 3, BSSID 4, and BSSID 5.

In some embodiments, the WLAN measurement configuration information further includes measurement quantity information, where the measurement quantity information indicates signal quality of the WLAN that needs to be measured by the user terminal. The signal quality of the WLAN includes at least one of: a received signal strength indicator RSSI, received signal code power RSCP, or a received signal-to-noise ratio indicator RSNI.

In some embodiments, when a WLAN measurement event is configured, a WLAN quantity threshold that matches the measurement event and that is necessary for satisfying the measurement event may further be configured.

For example, if a WLAN quantity threshold of the measurement event 1 is 2, a condition to be satisfied for the measurement event 1 is:
the measurement event 1: signal quality of two WLANs in the serving WLAN group is greater than the first threshold.

If a WLAN quantity threshold of the measurement event 2 is 5, a condition to be satisfied for the measurement event 2 is:
the measurement event 2: signal quality of five WLANs in the serving WLAN group is less than the first threshold.

If a serving WLAN quantity threshold of the measurement event 3 is 2, and a neighboring WLAN quantity threshold is 4, a condition to be satisfied for the measurement event 3 is:
the measurement event 3: signal quality of four WLANs in the neighboring WLAN group is greater than a sum of signal quality of either of two WLANs in the serving WLAN group and the third threshold.

If a serving WLAN quantity threshold of the measurement event 4 is 2, and a neighboring WLAN quantity threshold is 4, a condition to be satisfied for the measurement event 4 is:
the measurement event 4: signal quality of four WLANs in the neighboring WLAN group is greater than the fourth threshold and signal quality of two WLANs in the serving WLAN group is less than the fifth threshold.

If a neighboring WLAN quantity threshold of the measurement event 5 is 4, a condition to be satisfied for the measurement event 5 is:
the measurement event 5: signal quality of four WLANs in the neighboring WLAN group is greater than the sixth threshold.

If a neighboring WLAN quantity threshold of the measurement event 6 is 3, a condition to be satisfied for the measurement event 6 is:
the measurement event 6: signal quality of three WLANs in the neighboring WLAN group is less than the seventh threshold.

S504. The user terminal reports a measurement result of the at least one WLAN in the WLAN group to the base station when the at least one WLAN in the WLAN group satisfies the configured measurement event.

In a specific implementation, the measurement result includes a network identifier of a WLAN. The user terminal may report a network identifier of the at least one WLAN in the WLAN group that satisfies the configured measurement event to the base station, or may report network identifiers of all WLANs in the WLAN group to the base station. When no WLAN in the WLAN group satisfies the configured measurement event, the user terminal continues to measure at least one WLAN in the WLAN group, and determines whether the at least one WLAN in the WLAN group satisfies the configured measurement event.

In some embodiments, the test result further includes a group identifier of a WLAN, signal quality of a WLAN, load of a WLAN, or a transmission rate of a WLAN. The WLAN measurement configuration information further includes measurement result reporting configuration information, and the reporting configuration information of the measurement result indicates that the user terminal needs to report, to the base station, at least one of: the group identifier of the WLAN, the signal quality of the WLAN, the load of the WLAN, or the transmission rate of the WLAN.

Further, in some embodiments, different measurement results may be reported according to that the at least one WLAN in the WLAN group satisfies different measurement events. For example: when at least one WLAN in the serving WLAN group satisfies the measurement event 1, a network identifier of the at least one WLAN that satisfies the measurement event 1 or network identifiers of all WLANs in the serving WLAN group and signal quality of the at least one or all the WLANs may be reported, and WLAN load of another WLAN in the serving WLAN group and a transmission rate of the another WLAN are reported. When at least one WLAN in the serving WLAN group and at least one WLAN in the neighboring WLAN group satisfy the measurement event 3, network identifiers of all WLANs in the serving WLAN group and signal quality of all the WLANs may be reported, and a network identifier of the at least one WLAN that satisfies the measurement event 3 or network identifiers of all WLANs in the neighboring WLAN group, and signal quality of the at least one or all the WLANs are reported.

In some embodiments, the WLAN measurement configuration information further includes a measurement report reporting manner and/or a measurement report reporting period. The user terminal reports the measurement result of the at least one WLAN in the WLAN group to the base station according to the measurement report reporting manner and/or the measurement report reporting period. For example, reporting may be performed based on an event, or reporting is performed first based on an event and then periodically, or reporting is performed periodically. Event-based reporting is: when the at least one WLAN in the WLAN group satisfies one measurement event, reporting is performed once. Reporting performed first based on an event and then periodically is: when the at least one WLAN in the WLAN group satisfies one measurement event, reporting is performed once, and then periodical reporting is started. Reporting performed periodically is: when the at least one WLAN in the WLAN group satisfies one measurement event, periodical reporting is started. The measurement report reporting period may be 100 ms or 200 ms, but is not limited to the foregoing time.

S505. The base station allocates a WLAN to the user terminal according to the measurement result, so that the user terminal is connected to the WLAN.

In a specific implementation, as shown in FIG. 2, after receiving the measurement result sent by the user terminal, the base station sends a request message to the user terminal. The user terminal sends, to the base station according to the request message, a MAC address used by the user terminal in the WLAN. Then the base station sends a session establishment request message to a WT, to trigger the WT to establish a session path for a bearer of the user terminal, so that the WT replies the base station with a session establishment response message. Then the base station sends an LWA configuration message to user equipment, where the LWA configuration message is used to instruct the user equipment to start LWA, and the LWA configuration message carries an identifier of at least one WLAN to which the user terminal can be connected. Finally, the user terminal replies the base station with an LWA configuration completion message, and initiates a connection process and an authentication process to an AP according to one selected WLAN identifier in the identifier of the at least one WLAN, thereby establishing a network connection with the AP.

In this embodiment of the present invention, a user terminal first acquires WLAN group information, where the WLAN group information indicates at least one WLAN group; then determines whether at least one WLAN in the WLAN group satisfies a configured measurement event; and finally reports a measurement result of the at least one WLAN in the WLAN group to a base station when the at least one WLAN in the WLAN group satisfies the configured measurement event, thereby saving a signaling resource, and reducing signaling load caused by simultaneous reporting of a large quantity of WLAN measurement results.

Figure 6:
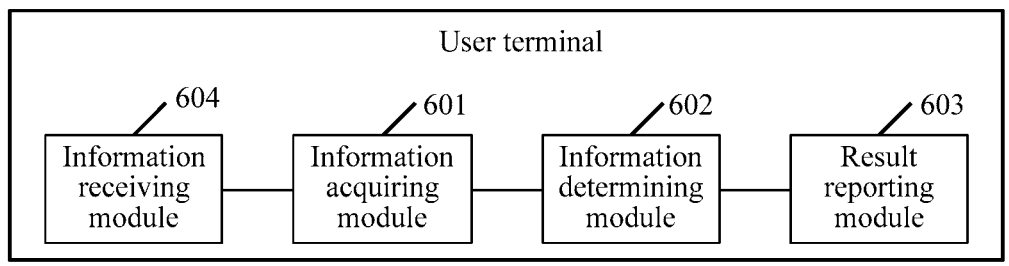
FIG. 6 is a schematic structural diagram of a user terminal according to an embodiment of the present invention.

Referring to FIG. 6, FIG. 6 is a schematic structural diagram of a user terminal according to an embodiment of the present invention. As shown in the figure, the user terminal in this embodiment of the present invention includes an information acquiring module 601, an information determining module 602, and a result reporting module 603.

The information acquiring module 601 is configured to acquire WLAN group information, where the WLAN group information indicates at least one WLAN group.

In a specific implementation, the WLAN group information may be acquired from a system message broadcast by the base station. First, the base station broadcasts a system message in a cell managed by the base station, where the system message includes WLAN group information; then, when user equipment detects that the user equipment enters the cell managed by the base station, the user equipment acquires the WLAN group information by reading the system message of the cell. The WLAN group information includes a network identifier of a WLAN. In some embodiments, the WLAN group information further includes a group identifier of the WLAN group, and a frequency or a channel number of the WALN network. For example, the WLAN group information may include the following grouping manners:

A first grouping manner:
group identifier 1, BSSID 1, BSSID 2, BSSID 3;
group identifier 2, BSSID 3, BSSID 4, BSSID 5, BSSID 6;
group identifier 3, BSSID 7;
group identifier 2, channel number=10, BSSID 1, BSSID 2, BSSID 4;
group identifier 5, frequency=3.5 GHz, BSSID 3, BSSID 4, BSSID 5;
. . . .

A second grouping manner:
channel number 1 or frequency 1
group identifier 1, BSSID 1, BSSID 2, BSSID 3;
group identifier 2, BSSID 3, BSSID 4, BSSID 5, BSSID 6;
group identifier 3, BSSID 7;
channel number 2 or frequency 2
group identifier 1, BSSID 1, BSSID 2, BSSID 3;
group identifier 2, BSSID 3, BSSID 4, BSSID 5.

In some embodiments, the WLAN group information may be acquired from the WLAN measurement configuration information. Grouping may be performed in the following grouping manner.

A WLAN measurement configuration message sent by an eNB to UE includes a measurement parameter such as a measurement event, and also includes measurement object information. The measurement object information includes the WLAN group information. The measurement object information may be a WLAN list that includes at least one WLAN group identifier.

For example, the eNB may configure, in the measurement configuration message, one or more of the following measurement objects for the UE:

measurement object identifier 1, BSSID 1, BSSID 2, BSSID 3;

measurement object identifier 2, BSSID 3, BSSID 4, BSSID 5, BSSID 6;

measurement object identifier 3, BSSID7;

measurement object identifier 4, channel number=10, BSSID 1, BSSID 2, BSSID 4;

measurement object identifier 5, frequency=3.5 GHz, BSSID 3, BSSID 4, BSSID 5;

. . . .

Certainly, the present disclosure does not exclude the following measurement object configuration manner:

measurement object identifier 1
channel number 1 or frequency 1
   group identifier 1, BSSID 1, BSSID 2, BSSID 3;
   group identifier 2, BSSID 3, BSSID 4, BSSID 5, BSSID 6;
   group identifier 3, BSSID 7;
. . . .
measurement object identifier 2
channel number 2 or frequency 2
   group identifier 1, BSSID 1, BSSID 2, BSSID 3;
   group identifier 2, BSSID 4, BSSID 5, BSSID 6;
. . . .

It should be noted that, for brevity, all the embodiments of the present invention are described by using a BSSID as an identifier of a WLAN. In an actual implementation process, an SSID, or an (H)ESSID may also be used as an identifier of a WLAN.

In some embodiments, the WLAN group information may be acquired from a dedicated radio resource control message, wherein the dedicated radio resource message is sent by the base station and is not the WLAN measurement configuration information. For example: WLAN group information is added to an LWA configuration message, and grouping may be performed in the first or the second grouping manner described above.

In some embodiments, if the system message broadcast by the base station includes the WLAN group information, the WLAN measurement configuration information may need to carry only the group identifier of the WLAN group, so that the user terminal acquires the group identifier of the WLAN group from the WLAN measurement configuration information, and it is unnecessary to list network identifiers of WLANs, thereby saving a signaling resource.

In some embodiments, if the system message broadcast by the base station includes the WLAN group information, the another dedicated radio resource control message may need to carry only the group identifier of the WLAN group, so that the user terminal acquires the group identifier of the WLAN group from the another dedicated radio resource control message, and it is unnecessary to list network identifiers of WLANs, thereby saving a signaling resource.

The information determining module 602 is configured to determine whether at least one WLAN in the WLAN group satisfies a configured measurement event.

In a specific implementation, satisfying the WLAN measurement configuration information may be satisfying the measurement event. The WLAN group includes a serving WLAN group and/or a neighboring WLAN group. The WLAN measurement configuration information includes at least one of the following measurement events:

a measurement event 1: signal quality of at least one WLAN in the serving WLAN group is greater than a first threshold;

a measurement event 2: signal quality of at least one WLAN in the serving WLAN group is less than a second threshold;

a measurement event 3: signal quality of at least one WLAN in the neighboring WLAN group is greater than a sum of signal quality of any one of at least one WLAN in the serving WLAN group and a third threshold, where the measurement event 3 has the following four possible forms:

a use case 1: radio signal quality of multiple WLANs in the neighboring WLAN group is greater than a sum of signal quality of one WLAN in the serving WLAN group and the third threshold;

a use case 2: radio signal quality of multiple WLANs in the neighboring WLAN group is greater than a sum of signal quality of any one WLAN of multiple WLANs in the serving WLAN group and the third threshold;

a use case 3: radio signal quality of one WLAN in the neighboring WLAN group is greater than a sum of signal quality of one WLAN in the serving WLAN group and the third threshold; and a use case 4: radio signal quality of one WLAN in the neighboring WLAN group is greater than a sum of signal quality of any one WLAN of multiple WLANs in the serving WLAN group and the third threshold;

a measurement event 4: signal quality of at least one WLAN in the neighboring WLAN group is greater than a fourth threshold and signal quality of at least one WLAN in the serving WLAN group is less than a fifth threshold, where the measurement event 4 has the following four possible forms:

a use case 1: radio signal quality of multiple WLANs in the neighboring WLAN group is greater than the fourth threshold and radio signal quality of one WLAN in the serving WLAN group is less than the fifth threshold;

a use case 2: radio signal quality of one WLAN in the neighboring WLAN group is greater than the fourth threshold and radio signal quality of one WLAN in the serving WLAN group is less than the fifth threshold;

a use case 3: radio signal quality of multiple WLANs in the neighboring WLAN group is greater than the fourth threshold and radio signal quality of multiple WLANs in the serving WLAN group is less than the fifth threshold; and a use case 4: radio signal quality of one WLAN in the neighboring WLAN group is greater than the fourth threshold and radio signal quality of multiple WLANs in the serving WLAN group is less than the fifth threshold;

a measurement event 5: signal quality of at least one WLAN in the neighboring WLAN group is greater than a sixth threshold; or a measurement event 6: signal quality of at least one WLAN in the neighboring WLAN group is less than a seventh threshold, where the serving WLAN group is a WLAN group comprising the WLAN associated with the user terminal, and the neighboring WLAN group is another WLAN group that does not include the WLAN associated with the user terminal. When the UE is not associated with any WLAN, all WLAN groups may be referred to as a neighboring WLAN group.

The measurement event 1 specifically includes: signal quality of all WLANs in the serving WLAN group is greater than the first threshold.

The measurement event 2 specifically includes: signal quality of all WLANs in the serving WLAN group is less than the second threshold.

The measurement event 3 specifically includes: signal quality of at least one WLAN in the neighboring WLAN group is greater than a sum of signal quality of any WLAN in the serving WLAN group and the third threshold.

The measurement event 4 specifically includes: signal quality of at least one WLAN in the neighboring WLAN group is greater than the fourth threshold and signal quality of all WLANs in the serving WLAN group is less than the fifth threshold.

It should be noted that the serving WLAN group may be applied to the measurement event 1, the measurement event 2, the measurement event 3, and the measurement event 4; and the neighboring WLAN group is applied to the events: the measurement event 3, the measurement event 4, the measurement event 5, and the measurement event 6. Moreover, the first threshold in the measurement event 1 may be −80 dB, the second threshold in the measurement event 2 may be 100 dB, and the third threshold in the measurement event 3 may be +3 dB, and the like, but values are not limited to the foregoing values.

In some embodiments, different measurement events may be configured for a same WLAN group (measurement object), or a same measurement event may be configured for different WLAN groups (measurement objects). A WLAN group (measurement object) is associated with a measurement event by using a measurement identifier. A correspondence between group identifiers and measurement events is shown as follow:

measurement identifier 1:
group identifier: WLAN group 1 or measurement object 1, measurement event: event 2, event 3;
measurement identifier 2:
group identifier: WLAN group 1 or measurement object 1, measurement event: event 4;
measurement identifier 3:
group identifier: WLAN group 2 or measurement object 2, measurement event: event 4.

For example: when the user terminal determines that the measurement identifier is measurement identifier 2, the user terminal may choose to measure WLAN group 1, and determine whether at least one WLAN in WLAN group 1 satisfies event 4. When the user terminal determines that the measurement identifier is measurement identifier 3, the user terminal chooses to measure WLAN group 2, and determines whether at least one WLAN in WLAN group 2 satisfies event 4.

In some embodiments, the WLAN measurement configuration information further includes a channel number and/or frequency information of the WLAN. The at least one WLAN in the WLAN group may be measured according to the channel number and/or the frequency information of the WLAN. For example: in the second grouping manner described above, if the channel number and/or the frequency information of the WLAN is channel number 2 or frequency 2, the user terminal measures the at least one WLAN in the WLAN group according to that group identifier 1 corresponds to BSSID 1, BSSID 2, and BSSID 3, and that group identifier 2 corresponds to BSSID 3, BSSID 4, and BSSID 5.

In some embodiments, the WLAN measurement configuration information further includes measurement quantity information, where the measurement quantity information indicates signal quality of the WLAN that needs to be measured by the user terminal. The signal quality of the WLAN includes at least one of: a received signal strength indicator RSSI, received signal code power RSCP, or a received signal-to-noise ratio indicator RSNI.

In some embodiments, when a WLAN measurement event is configured, a WLAN quantity threshold that matches the measurement event and that is necessary for satisfying the measurement event may further be configured.

For example, if a WLAN quantity threshold of the measurement event 1 is 2, a condition to be satisfied for the measurement event 1 is:

the measurement event 1: signal quality of two WLANs in the serving WLAN group is greater than the first threshold.

If a WLAN quantity threshold of the measurement event 2 is 5, a condition to be satisfied for the measurement event 2 is:

the measurement event 2: signal quality of five WLANs in the serving WLAN group is less than the first threshold.

If a serving WLAN quantity threshold of the measurement event 3 is 2, and a neighboring WLAN quantity threshold is 4, a condition to be satisfied for the measurement event 3 is:

the measurement event 3: signal quality of four WLANs in the neighboring WLAN group is greater than a sum of signal quality of either of two WLANs in the serving WLAN group and the third threshold.

If a serving WLAN quantity threshold of the measurement event 4 is 2, and a neighboring WLAN quantity threshold is 4, a condition to be satisfied for the measurement event 4 is:

the measurement event 4: signal quality of four WLANs in the neighboring WLAN group is greater than the fourth threshold and signal quality of two WLANs in the serving WLAN group is less than the fifth threshold.

If a neighboring WLAN quantity threshold of the measurement event 5 is 4, a condition to be satisfied for the measurement event 5 is:

the measurement event 5: signal quality of four WLANs in the neighboring WLAN group is greater than the sixth threshold.

If a neighboring WLAN quantity threshold of the measurement event 6 is 3, a condition to be satisfied for the measurement event 6 is:

the measurement event 6: signal quality of three WLANs in the neighboring WLAN group is less than the seventh threshold.

The result reporting module 603 is configured to report a measurement result of the at least one WLAN in the WLAN group to a base station when the at least one WLAN in the WLAN group satisfies the configured measurement event.

In a specific implementation, the measurement result includes a network identifier of a WLAN. A network identifier of the at least one WLAN in the WLAN group that satisfies the configured measurement event may be reported to the base station, or network identifiers of all WLANs in the WLAN group may be reported to the base station. When no WLAN in the WLAN group satisfies the configured measurement event, the user terminal continues to measure at least one WLAN in the WLAN group, and determines whether the at least one WLAN in the WLAN group satisfies the configured measurement event.

In some embodiments, the test result further includes a group identifier of a WLAN, signal quality of a WLAN, load of a WLAN, or a transmission rate of a WLAN. The WLAN measurement configuration information further includes measurement result reporting configuration information, and the reporting configuration information of the measurement result indicates that the user terminal needs to report, to the base station, at least one of: the group identifier of the WLAN, the signal quality of the WLAN, the load of the WLAN, or the transmission rate of the WLAN.

Further, in some embodiments, different measurement results may be reported according to that the at least one WLAN in the WLAN group satisfies different measurement events. For example: when at least one WLAN in the serving WLAN group satisfies the measurement event 1, a network identifier of the at least one WLAN that satisfies the measurement event 1 or network identifiers of all WLANs in the serving WLAN group and signal quality of the at least one or all the WLANs may be reported, and WLAN load of another WLAN in the serving WLAN group and a transmission rate of the another WLAN are reported. When at least one WLAN in the serving WLAN group and at least one WLAN in the neighboring WLAN group satisfy the measurement event 3, network identifiers of all WLANs in the serving WLAN group and signal quality of all the WLANs may be reported, and a network identifier of the at least one WLAN that satisfies the measurement event 3 or network identifiers of all WLANs in the neighboring WLAN group, and signal quality of the at least one or all the WLANs are reported.

In some embodiments, the WLAN measurement configuration information further includes a measurement report reporting manner and/or a measurement report reporting period. The measurement result of the at least one WLAN in the WLAN group may be reported to the base station according to the measurement report reporting manner and/or the measurement report reporting period. For example, reporting may be performed based on an event, or reporting is performed first based on an event and then periodically, or reporting is performed periodically. Event-based reporting is: when the at least one WLAN in the WLAN group satisfies one measurement event, reporting is performed once. Reporting performed first based on an event and then periodically is: when the at least one WLAN in the WLAN group satisfies one measurement event, reporting is performed once, and then periodical reporting is started. Reporting performed periodically is: when the at least one WLAN in the WLAN group satisfies one measurement event, periodical reporting is started. The measurement report reporting period may be 100 ms or 200 ms, but is not limited to the foregoing time.

In some embodiments, as shown in FIG. 6, the user terminal in this embodiment of the present invention may further include:

an information receiving module 604, configured to receive the WLAN measurement configuration information sent by the base station.

In this embodiment of the present invention, a user terminal first acquires WLAN group information, where the WLAN group information indicates at least one WLAN group; then determines whether at least one WLAN in the WLAN group satisfies a configured measurement event; and finally reports a measurement result of the at least one WLAN in the WLAN group to a base station when the at least one WLAN in the WLAN group satisfies the configured measurement event, thereby saving a signaling resource, and reducing signaling load caused by simultaneous reporting of a large quantity of WLAN measurement results.

Figure 7:
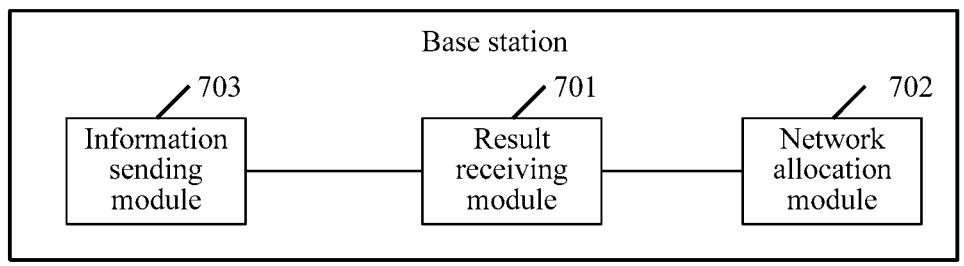
FIG. 7 is a schematic structural diagram of a base station according to an embodiment of the present invention.

Referring to FIG. 7, FIG. 7 is a schematic structural diagram of a base station according to an embodiment of the present invention. As shown in the figure, the base station in this embodiment of the present invention includes a result receiving module 701 and a network allocation module 702, The result receiving module 701 is configured to receive a measurement result that is sent by a user terminal and that is of at least one WLAN in a WLAN group.

In a specific implementation, the user terminal first acquires WLAN group information, where the WLAN group information indicates at least one WLAN group; then the user terminal determines whether the at least one WLAN in the WLAN group satisfies a configured measurement event; and finally the user terminal reports the measurement result of the at least one WLAN in the WLAN group to the base station when the at least one WLAN in the WLAN group satisfies the configured measurement event. The result receiving module 701 receives the measurement result that is sent by the user terminal and that is of the at least one WLAN in the WLAN group.

The WLAN group includes a serving WLAN group and/or a neighboring WLAN group. The WLAN measurement configuration information includes at least one of the following measurement events:

a measurement event 1: signal quality of at least one WLAN in the serving WLAN group is greater than a first threshold;

a measurement event 2: signal quality of at least one WLAN in the serving WLAN group is less than a second threshold;

a measurement event 3: signal quality of at least one WLAN in the neighboring WLAN group is greater than a sum of signal quality of any one of at least one WLAN in the serving WLAN group and a third threshold, where the measurement event 3 has the following four possible forms:

a use case 1: radio signal quality of multiple WLANs in the neighboring WLAN group is greater than a sum of signal quality of one WLAN in the serving WLAN group and the third threshold;

a use case 2: radio signal quality of multiple WLANs in the neighboring WLAN group is greater than a sum of signal quality of any one WLAN of multiple WLANs in the serving WLAN group and the third threshold;

a use case 3: radio signal quality of one WLAN in the neighboring WLAN group is greater than a sum of signal quality of one WLAN in the serving WLAN group and the third threshold; and a use case 4: radio signal quality of one WLAN in the neighboring WLAN group is greater than a sum of signal quality of any one WLAN of multiple WLANs in the serving WLAN group and the third threshold;

a measurement event 4: signal quality of at least one WLAN in the neighboring WLAN group is greater than a fourth threshold and signal quality of at least one WLAN in the serving WLAN group is less than a fifth threshold, where the measurement event 4 has the following four possible forms:

a use case 1: radio signal quality of multiple WLANs in the neighboring WLAN group is greater than the fourth threshold and radio signal quality of one WLAN in the serving WLAN group is less than the fifth threshold;

a use case 2: radio signal quality of one WLAN in the neighboring WLAN group is greater than the fourth threshold and radio signal quality of one WLAN in the serving WLAN group is less than the fifth threshold;

a use case 3: radio signal quality of multiple WLANs in the neighboring WLAN group is greater than the fourth threshold and radio signal quality of multiple WLANs in the serving WLAN group is less than the fifth threshold; and a use case 4: radio signal quality of one WLAN in the neighboring WLAN group is greater than the fourth threshold and radio signal quality of multiple WLANs in the serving WLAN group is less than the fifth threshold;

a measurement event 5: signal quality of at least one WLAN in the neighboring WLAN group is greater than a sixth threshold; or a measurement event 6: signal quality of at least one WLAN in the neighboring WLAN group is less than a seventh threshold, where the serving WLAN group is a WLAN group comprising the WLAN associated with the user terminal, and the neighboring WLAN group is another WLAN group that does not include the WLAN associated with the user terminal. When the UE is not associated with any WLAN, all WLAN groups may be referred to as a neighboring WLAN group.

The measurement event 1 specifically includes: signal quality of all WLANs in the serving WLAN group is greater than the first threshold.

The measurement event 2 specifically includes: signal quality of all WLANs in the serving WLAN group is less than the second threshold.

The measurement event 3 specifically includes: signal quality of at least one WLAN in the neighboring WLAN group is greater than a sum of signal quality of any WLAN in the serving WLAN group and the third threshold.

The measurement event 4 specifically includes: signal quality of at least one WLAN in the neighboring WLAN group is greater than the fourth threshold and signal quality of all WLANs in the serving WLAN group is less than the fifth threshold.

It should be noted that the serving WLAN group may be applied to the measurement event 1, the measurement event 2, the measurement event 3, and the measurement event 4; and the neighboring WLAN group is applied to the events: the measurement event 3, the measurement event 4, the measurement event 5, and the measurement event 6. Moreover, the first threshold in the measurement event 1 may be −80 dB, the second threshold in the measurement event 2 may be 100 dB, and the third threshold in the measurement event 3 may be +3 dB, and the like, but values are not limited to the foregoing values.

In some embodiments, the measurement result includes a network identifier of a WLAN. A network identifier, sent by the user terminal, of the at least one WLAN in the WLAN group that satisfies a configured measurement event may be received, or network identifiers of all WLANs in the WLAN group that are sent by the user terminal may be received.

In some embodiments, the test result further includes a group identifier of a WLAN, signal quality of a WLAN, load of a WLAN, or a transmission rate of a WLAN. The WLAN measurement configuration information further includes measurement result reporting configuration information, and the reporting configuration information of the measurement result indicates that the user terminal needs to report, to the base station, at least one of: the group identifier of the WLAN, the signal quality of the WLAN, the load of the WLAN, or the transmission rate of the WLAN, so that at least one of: the signal quality of the WLAN, the load of the WLAN, or the transmission rate of the WLAN that is sent by the user terminal can be received.

The network allocation module 702 is configured to allocate a WLAN to the user terminal according to the measurement result, so that the user terminal is connected to the WLAN.

In a specific implementation, as shown in FIG. 2, after receiving the measurement result sent by the user terminal, the result receiving module 701 sends a request message to the user terminal. The user terminal sends, to the base station according to the request message, a MAC address used by the user terminal in the WLAN. Then the base station sends a session establishment request message to a WT, to trigger the WT to establish a session path for a bearer of the user terminal, so that the WT replies the base station with a session establishment response message. Then the base station sends an LWA configuration message to user equipment, where the LWA configuration message is used to instruct the user equipment to start LWA, and the LWA configuration message carries an identifier of at least one WLAN to which the user terminal can be connected. Finally, the user terminal replies the base station with an LWA configuration completion message, and initiates a connection process and an authentication process to an AP according to one selected WLAN identifier in the identifier of the at least one WLAN, thereby establishing a network connection with the AP.

As shown in FIG. 7, the base station in this embodiment of the present invention may further include:

an information sending module 703, configured to send WLAN measurement configuration information to the user terminal, so that the user terminal determines whether the at least one WLAN in the WLAN group satisfies the configured measurement event, and the user terminal reports the measurement result of the at least one WLAN in the WLAN group to the base station when the user terminal determines that the at least one WLAN in the WLAN group satisfies the configured measurement event.

In this embodiment of the present invention, a user terminal first acquires WLAN group information, where the WLAN group information indicates at least one WLAN group; then determines whether at least one WLAN in the WLAN group satisfies a configured measurement event; and finally reports a measurement result of the at least one WLAN in the WLAN group to a base station when the at least one WLAN in the WLAN group satisfies the configured measurement event, thereby saving a signaling resource, and reducing signaling load caused by simultaneous reporting of a large quantity of WLAN measurement results.

Figure 8:
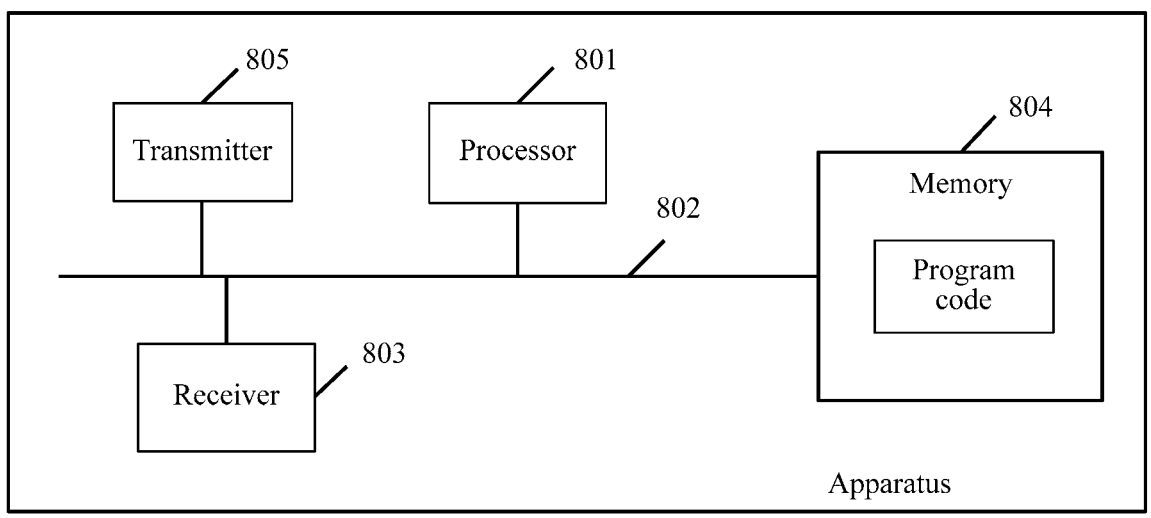
FIG. 8 is a schematic structural diagram of a wireless local area network WLAN measurement and reporting apparatus according to an embodiment of the present invention.

FIG. 8 is a schematic structural diagram of a wireless local area network WLAN measurement and reporting apparatus according to an embodiment of the present invention, and the apparatus may include a user terminal. As shown in the figure, the apparatus may include: at least one processor 801, for example, a CPU, at least one receiver 803, at least one memory 804, at least one transmitter 805, and at least one communications bus 802. The communications bus 802 is configured to implement connection communication among these components. The memory 804 may be a high-speed RAM memory, or may be a non-volatile memory, for example, at least one magnetic disk storage. In some embodiments, the memory 804 may further be at least one storage apparatus that is located far away from the foregoing processor 801. The memory 804 stores a set of program code, and the processor 801 is configured to invoke the program code stored in the memory 62. The apparatus performs the following operations:

acquiring, by the receiver 803, WLAN group information, where the WLAN group information indicates at least one WLAN group;

determining, by the processor 801, whether at least one WLAN in the WLAN group satisfies a configured measurement event; and reporting, by the transmitter 805, a measurement result of the at least one WLAN in the WLAN group to a base station when the at least one WLAN in the WLAN group satisfies the configured measurement event.

In some embodiments, the WLAN group includes a serving WLAN group and/or a neighboring WLAN group.

The WLAN measurement configuration information includes at least one of the following measurement events:

a measurement event 1: signal quality of at least one WLAN in the serving WLAN group is greater than a first threshold;

a measurement event 2: signal quality of at least one WLAN in the serving WLAN group is less than a second threshold;

a measurement event 3: signal quality of at least one WLAN in the neighboring WLAN group is greater than a sum of signal quality of any one of at least one WLAN in the serving WLAN group and a third threshold, where a measurement event 4: signal quality of at least one WLAN in the neighboring WLAN group is greater than a fourth threshold and signal quality of at least one WLAN in the serving WLAN group is less than a fifth threshold;

a measurement event 5: signal quality of at least one WLAN in the neighboring WLAN group is greater than a sixth threshold; or a measurement event 6: signal quality of at least one WLAN in the neighboring WLAN group is less than a seventh threshold, where the serving WLAN group is a WLAN group comprising the WLAN associated with the user terminal, and the neighboring WLAN group is another WLAN group that does not include the WLAN associated with the user terminal. When the UE is not associated with any WLAN, all WLAN groups may be referred to as a neighboring WLAN group.

In some embodiments, the measurement event 1 specifically includes:

signal quality of all WLANs in the serving WLAN group is greater than the first threshold.

In some embodiments, the measurement event 2 specifically includes:

signal quality of all WLANs in the serving WLAN group is less than the second threshold.

In some embodiments, the measurement event 3 specifically includes:

signal quality of at least one WLAN in the neighboring WLAN group is greater than a sum of signal quality of any WLAN in the serving WLAN group and the third threshold.

In some embodiments, the measurement event 4 specifically includes:

signal quality of at least one WLAN in the neighboring WLAN group is greater than the fourth threshold and signal quality of all WLANs in the serving WLAN group is less than the fifth threshold.

In some embodiments, the receiver 803 receives the WLAN measurement configuration information sent by the base station.

In some embodiments, the WLAN measurement configuration information further includes a channel number and/or frequency information of the WLAN. The transmitter 805 measures the at least one WLAN in the WLAN group according to the channel number and/or the frequency information of the WLAN.

In some embodiments, the WLAN measurement configuration information further includes a measurement report reporting manner and/or a measurement report reporting period. The processor 801 reports the measurement result of the at least one WLAN in the WLAN group to the base station according to the measurement report reporting manner and/or the measurement report reporting period.

In some embodiments, the measurement result includes a network identifier of a WLAN. The transmitter 805 reports a network identifier of the at least one WLAN in the WLAN group that satisfies the configured measurement event to the base station.

In some embodiments, the test result further includes at least one of: a group identifier of a WLAN, signal quality of a WLAN, load of a WLAN, or a transmission rate of a WLAN.

In some embodiments, the WLAN measurement configuration information further includes measurement result reporting configuration information, and the reporting configuration information of the measurement resultindicates that the user terminal needs to report, to the base station, at least one of: the group identifier of the WLAN, the signal quality of the WLAN, the load of the WLAN, or the transmission rate of the WLAN.

In some embodiments, the signal quality of the WLAN includes at least one of: a received signal strength indicator RSSI, received signal code power RSCP, or a received signal-to-noise ratio indicator RSNI.

In some embodiments, the WLAN group includes the network identifier of the WLAN.

In some embodiments, the WLAN group information further includes a group identifier of the WLAN group.

In some embodiments, the receiver 803 acquires the WLAN group information from a system message broadcast by the base station.

In some embodiments, the receiver 803 acquires the WLAN group information from the WLAN measurement configuration information.

In some embodiments, the receiver 803 acquires the WLAN group information from a dedicated radio resource control message, wherein the dedicated radio resource message is sent by the base station and is not the WLAN measurement configuration information.

It should be noted that, for brief description, the foregoing method embodiments are represented as a series of actions. However, persons skilled in the art should appreciate that the present application is not limited to the described order of the actions, because according to the present application, some steps may be performed in other orders or simultaneously. It should be further appreciated by persons skilled in the art that the embodiments described in this specification all belong to exemplary embodiments, and the involved actions and modules are not necessarily required by the present application.

In the foregoing embodiments, the description of each embodiment has a respective focus. For a part that is not described in detail in an embodiment, reference may be made to related description in other embodiments.

Persons of ordinary skill in the art may understand that all or some of the steps of the methods in the embodiments may be implemented by a program instructing relevant hardware. The program may be stored in a computer readable storage medium. The storage medium may include a flash memory, a read-only memory (ROM), a random access memory (RAM), a magnetic disk, and an optical disc.

In the above, the WLAN measurement and reporting method and the related device and system provided in the embodiments of the present invention are described in detail. The principle and implementation manners of the present disclosure are described herein through specific examples. The description about the embodiments of the present invention is merely provided to help understand the method and core ideas of the present disclosure. In addition, persons of ordinary skill in the art can make variations and modifications to the present disclosure in terms of the specific implementations and application scopes according to the ideas of the present disclosure. Therefore, the content of the specification shall not be construed as a limit to the scope of the present disclosure.

What is claimed is:

1. A wireless local area network (WLAN) measurement and reporting method, wherein the method comprises:
    receiving, by a user terminal, WLAN measurement configuration information from a base station, wherein the WLAN measurement configuration information comprises at least one measurement condition;
    acquiring, by the user terminal, WLAN group information, wherein the WLAN group information indicates a WLAN group, wherein the WLAN group comprises at least one of a serving WLAN group or a neighboring WLAN, wherein the serving WLAN group is a WLAN group comprising a WLAN associated with the user terminal, and the neighboring WLAN group is a WLAN group comprising one or more WLAN other than the WLAN associated with the user terminal;
    determining, by the user terminal, whether at least one WLAN in the WLAN group satisfies a measurement condition in the WLAN measurement configuration information; and
    reporting, by the user terminal, a measurement result of the at least one WLAN in the WLAN group to a base station when the at least one WLAN in the WLAN group satisfies the measurement condition; and, wherein
    the WLAN measurement configuration information comprises:
    a measurement condition 1: signal quality of all WLANs in the serving WLAN group is less than a first threshold; or
    a measurement condition 2: signal quality of at least one WLAN in the neighboring WLAN group is greater than a second threshold and signal quality of all WLANs in the serving WLAN group is less than a third threshold.

2. The method according to claim 1, wherein the signal quality of the WLAN comprises a received signal strength indicator (RSSI).

3. The method according to claim 1, wherein the WLAN measurement configuration information comprises frequency information of the at least one WLAN; and
    the method further comprises:
    measuring, by the user terminal, the at least one WLAN in the WLAN group according to the frequency information of the at least one WLAN to obtain the measurement result.

4. The method according to claim 1, wherein the measurement result comprises a network identifier of a WLAN, and reporting, by the user terminal, a measurement result of the at least one WLAN in the WLAN group to a base station comprises:
    reporting, by the user terminal, a network identifier of the at least one WLAN in the WLAN group that satisfies the WLAN measurement configuration information to the base station.

5. The method according to claim 3, wherein the measurement result further comprises at least one of: signal quality of a WLAN, load of a WLAN, or a transmission rate of a WLAN.

6. The method according to claim 4, wherein the WLAN measurement configuration information comprises reporting configuration information of the measurement result, and the reporting configuration information of the measurement result indicates that the user terminal reports, to the base station, at least one of: the signal quality of the WLAN, the load of the WLAN, or the transmission rate of the WLAN.

7. The method according to claim 1, wherein the WLAN group information comprises the network identifier of the at least one WLAN, or the WLAN group information comprises the network identifier of the at least one WLAN and the frequency information of the at least one WLAN.

8. The method according to claim 1, wherein the acquiring WLAN group information comprises:
    acquiring, by the user terminal, the WLAN group information from the WLAN measurement configuration information.

9. The method according to claim 1, wherein the acquiring WLAN group information comprises:
    acquiring, by the user terminal, the WLAN group information from a dedicated radio resource control message, wherein the dedicated radio resource message is sent by the base station and is not the WLAN measurement configuration information.

10. An apparatus, applied to a user terminal, comprising a memory and a processor, wherein
    the processor is configured to perform the following operations:
    receiving WLAN measurement configuration information from a base station, wherein the WLAN measurement configuration information comprises at least one measurement condition;
    acquiring WLAN group information, wherein the WLAN group information indicates a WLAN group, wherein the WLAN group comprises at least one of a serving WLAN group or a neighboring WLAN group, wherein the serving WLAN group is a WLAN group comprising the WLAN associated with the user terminal, and the neighboring WLAN group is a WLAN group comprising one or more WLAN other than the WLAN associated with the user terminal;
    determining whether at least one WLAN in the WLAN group satisfies a measurement condition in the WLAN measurement configuration information; and
    reporting a measurement result of the at least one WLAN in the WLAN group to a base station when the at least one WLAN in the WLAN group satisfies the measurement condition;
    wherein the WLAN measurement configuration information comprises:
    a measurement condition 1: signal quality of all WLANs in the serving WLAN group is less than a first threshold; or
    a measurement condition 2: signal quality of at least one WLAN in the neighboring WLAN group is greater than a second threshold and signal quality of all WLANs in the serving WLAN group is less than a third threshold.

11. The apparatus according to claim 10, wherein the signal quality of the WLAN comprises at least one of: a received signal strength indicator (RSSI).

12. The apparatus according to claim 10, wherein the WLAN measurement configuration information further comprises frequency information of the at least one WLAN; and the processor is further configured to measure the at least one WLAN in the WLAN group according to the frequency information of the at least one WLAN to obtain the measurement result.

13. The apparatus according to claim 10, wherein the measurement result comprises a network identifier of a WLAN, and the processor is configured to:

report a network identifier of the at least one WLAN in the WLAN group that satisfies the WLAN measurement configuration information to the base station.

14. The apparatus according to claim 13, wherein the measurement result further comprises at least one of: signal quality of a WLAN, load of a WLAN, or a transmission rate of a WLAN.

15. The apparatus according to claim 14, wherein the WLAN measurement configuration information comprises measurement result reporting configuration information, and the reporting configuration information of the measurement result indicates that the apparatus reports, to the base station, at least one of: the signal quality of the WLAN, the load of the WLAN, or the transmission rate of the WLAN.

16. The apparatus according to claim 10, wherein the WLAN group information comprises the network identifier of the at least one WLAN, or the WLAN group information comprises the network identifier of the at least one WLAN and the frequency information of the at least one WLAN.

17. The apparatus according to claim 10, wherein the processor is configured to:

acquire the WLAN group information from the WLAN measurement configuration information.

18. The apparatus according to claim 10, wherein the processor is configured to:

acquire the WLAN group information from a dedicated radio resource control message, wherein the dedicated radio resource message is sent by the base station and is not the WLAN measurement configuration information.

19. A non-transitory processor-readable medium having processor-executable instructions stored thereon for a user terminal, the processor-executable instructions, when executed by a processor, facilitating performance of the following:

receiving WLAN measurement configuration information from a base station, wherein the WLAN measurement configuration information comprises at least one measurement condition;

acquiring WLAN group information, wherein the WLAN group information indicates a WLAN group, wherein the WLAN group comprises at least one of a serving WLAN group or a neighboring WLAN group, wherein the serving WLAN group is a WLAN group comprising the WLAN associated with the user terminal, and the neighboring WLAN group is a WLAN group comprising one or more WLAN other than the WLAN associated with the user terminal;

determining whether at least one WLAN in the WLAN group satisfies a measurement condition in the WLAN measurement configuration information; and reporting a measurement result of the at least one WLAN in the WLAN group to a base station when the at least one WLAN in the WLAN group satisfies the measurement condition;

wherein the WLAN measurement configuration information comprises:

a measurement condition 1: signal quality of all WLANs in the serving WLAN group is less than a first threshold; or a measurement condition 2: signal quality of at least one WLAN in the neighboring WLAN group is greater than a second threshold and signal quality of all WLANs in the serving WLAN group is less than a third threshold.

* * * * *